Oct. 7, 1969  D. ENGELSMANN ET AL  3,470,799
CAMERA STRUCTURE FOR INDICATING WHEN THE
CAMERA IS READY FOR OPERATION
Filed Jan. 28, 1965  7 Sheets-Sheet 1

INVENTOR.
DIETER ENGELSMANN
BY ERWIN v. WASIELEWSKI
ALFRED WINKLER

Michael S. Striker
A. Hery

INVENTOR.
DIETER ENGELSMANN
ERWIN v. WASIELEWSKI
ALFRED WINKLER

Oct. 7, 1969
D. ENGELSMANN ET AL  3,470,799
CAMERA STRUCTURE FOR INDICATING WHEN THE
CAMERA IS READY FOR OPERATION
Filed Jan. 28, 1965
7 Sheets-Sheet 3
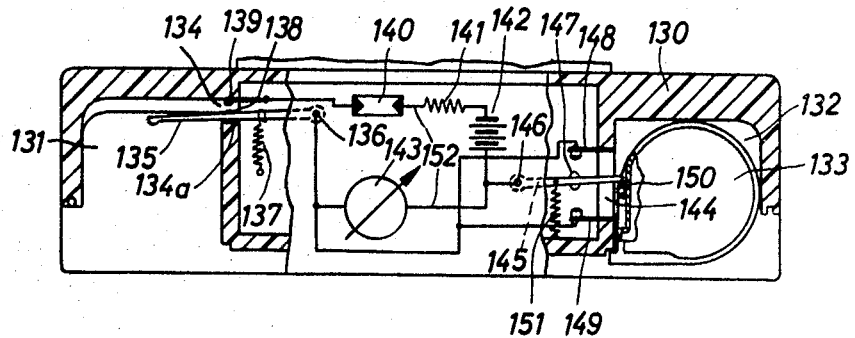
Fig. 8
Fig. 9
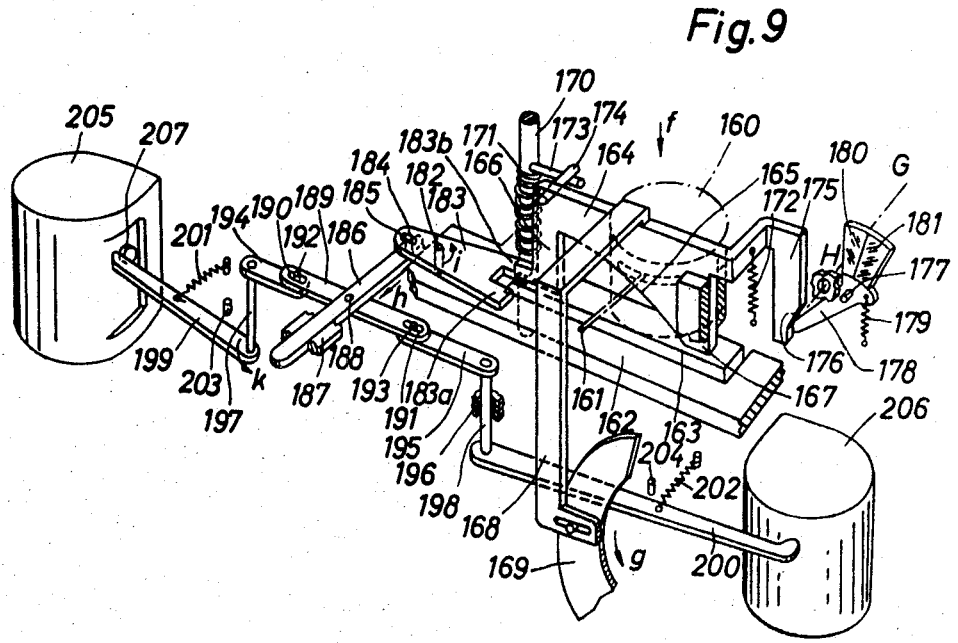
INVENTOR.
DIETER ENGELSMANN
BY ERWIN v. WASIELEWSKI
ALFRED WINKLER INVENTOR.
DIETER ENGELSMANN
ERWIN v. WASIELEWSKI
ALFRED WINKLER
BY

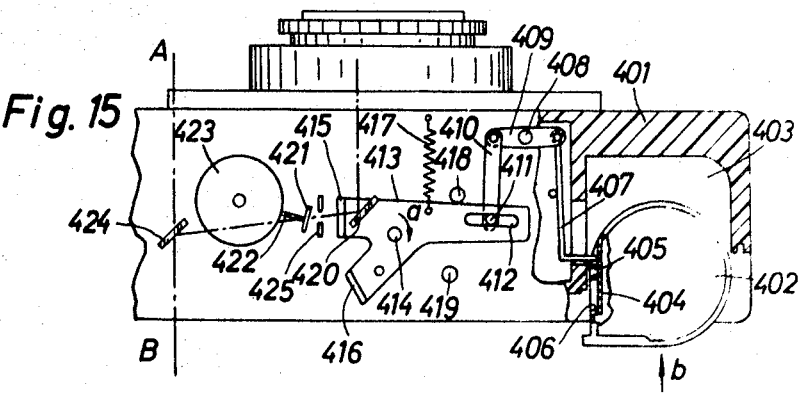

Oct. 7, 1969  D. ENGELSMANN ET AL  3,470,799
CAMERA STRUCTURE FOR INDICATING WHEN THE
CAMERA IS READY FOR OPERATION
Filed Jan. 28, 1965  7 Sheets-Sheet 7
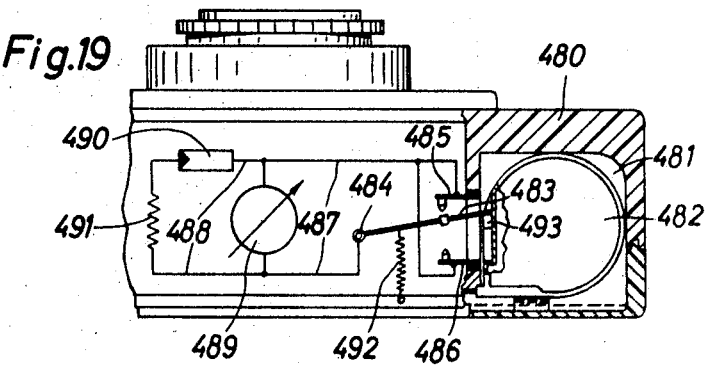
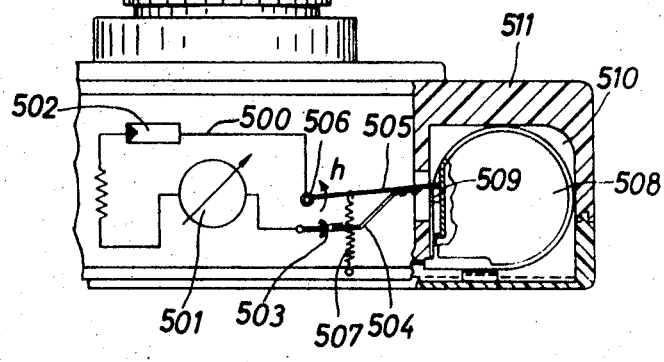
INVENTOR.
BY  DIETER ENGELSMANN
ERWIN v. WASIELEWSKI
ALFRED WINKLER United States Patent Office 3,470,799
Patented Oct. 7, 1969

3,470,799
CAMERA STRUCTURE FOR INDICATING WHEN THE CAMERA IS READY FOR OPERATION
Dieter Engelsmann, Unterhaching, near Munich, and Erwin von Wasielewski and Alfred Winkler, Munich, Germany, assignors to Agfa Aktiengesellschaft, Leverkusen, Germany
Filed Jan. 28, 1965, Ser. No. 428,667
Claims priority, application Germany, Feb. 12, 1964, A 45,206, A 21,291; Feb. 13, 1964, A 45,222
Int. Cl. G03b 19/04, 17/18
U.S. Cl. 95—10                                    57 Claims

ABSTRACT OF THE DISCLOSURE

One or both cartridge chambers of a photographic still camera receive portions of feeler levers which can be displaced by cartridges to cause the generation of a signal or indication informing the user of the camera of the presence or absence of cartridges. That feeler lever which extends into the chamber for the supply cartridge can indicate the film speed and it may be used further to positively prevent operation of the camera when the supply cartridge is missing or when the film speed is not within the desired range. If the camera has two feeler levers, either of these levers can prevent operation if the respective cartridge is missing.

---

The present invention relates to cameras.

In particular, the present invention relates to that type of camera which receives a supply cartridge of unexposed film and which carries an empty take-up cartridge into which the exposed film moves, so that after the complete film strip has been exposed, this complete film strip is situated in the take-up cartridge which is then removed from the camera so that the exposed film can be developed. The empty supply cartridge can then be used as a take-up cartridge for the next supply cartridge or a different empty take-up cartridge can be introduced into the camera when a new supply cartridge with unexposed film is placed in the camera. Preferably the supply cartridge carries a projection whose position on the supply cartridge is indicative of the speed of the film in the cartridge, and when the supply cartridge is introduced into the camera this projection can actuate a structure which automatically adjusts the camera to take into account the film speed.

If the operator of such a camera does not exercise sufficient care, it is possible for faulty operation to result from a plurality of causes. For example, the operator may attempt to make exposures when there is no supply cartridge in the camera, and of course under these circumstances there simply will be no exposure of any film. Also, the operator may quickly glance at the camera and notice that there is indeed a supply cartridge in the cartridge in the cartridge chamber, but this cartridge may be the cartridge from the film strip which has already been exposed and which is now located in the take-up cartridge, so that in this event also the operator can continue to operate the camera without making any exposures. On the other hand, it may well be that while the operator notices that there is indeed a supply cartridge in the camera, the operator has neglected to check as to whether or not there is a take-up cartridge in the camera, and under these circumstances while the film will indeed be properly exposed, it is not moving into any take-up cartridge so that when the camera is opened the film is not protected against light and is therefore rendered useless. Moreover, inasmuch as most cameras are designed to handle a given range of film speeds, it may happen that the speed of the film in a particular supply cartridge has a value which is beyond the range which can be handled by the camera, in which case improper exposures will be made inasmuch as the camera cannot be adjusted to take into account the particular film speed which is beyond the range of film speeds which can properly be handled by the camera.

Thus it will be seen that with a camera of this type there are indeed various pitfalls which should be avoided by the careful operator and when it is remembered that cameras of this type are particularly designed for operation by amateurs, it is clear that there will be faulty operation in many cases resulting from neglect on the part of the operator.

It is therefore a primary object of the present invention to provide for a camera of the above type a structure which will indicate to the operator in a fully automatic manner when the camera is ready for proper operation so that none of the above defective operations can take place.

In particular, it is an object of the invention to provide a structure which will indicate to the operator in the viewfinder of the camera whether or not the camera is ready for operation, so that in this way when the operator looks through the viewfinder to frame the object which is to be photographed the operator will be warned as to whether or not the camera is ready for proper operation.

Also, it is an object of the present invention to provide a structure which will indicate to the operator that the camera is not ready for proper operation as by preventing operation of a part of the camera which must be operated in connection with the making of an exposure. For example, the structure of the invention can act on the film-transporting means to block this latter means so as to prevent transportation of the film unless the camera is ready for proper operation.

Also, with the camera which is of the type which has a built-in light-measuring structure, it is an object of the invention to provide a structure which will influence the light-measuring structure in such a way that through this light-measuring structure the operator will receive an indication as to whether or not the camera is ready for proper operation.

Furthermore, it is an object of the present invention to provide a structure which makes use of a projection of the above type, this projection being mounted on the exterior of the supply cartridge to indicate the speed of the film therein, in order to actuate a structure which will indicate to the operator, either by giving the operator a warning or by preventing operation of the camera, whether or not the camera is ready for proper operation.

In addition, it is an object of the present invention to provide a structure which will act automatically, either to prevent operation of the camera or to warn the operator that the camera is not ready for proper operation, when the speed of the film in the supply cartridge is beyond the range of film speeds which can be handled by the camera.

The objects of the present invention also include the provision of a camera which will either warn the operator or which will prevent camera operation whenever the camera fails to include both a take-up cartridge and a supply cartridge which contains a film whose film speed can properly be exposed in the particular camera.

With these objects in view the invention includes, in a camera, a camera housing formed with a cartridge chamber which is adapted to receive a supply cartridge which carries a projection whose position on the supply cartridge is indicative of the speed of the film in the supply cartridge. An indicating means is carried by the camera housing and extends into this chamber to cooperate with a supply cartridge introduced into the latter, and in particular with the projection of the supply cartridge, to indicate to the operator that the camera is not ready for operation, either by giving a warning signal to the operator or by preventing operation of the camera, whenever there is no supply cartridge in the cartridge chamber or when the particular supply cartridge is one which contains a film whose speed is beyond the range which can be properly handled by the camera. Also, the structure of the invention includes for a camera of the above type a means which will respond to the presence or absence of a take-up cartridge in the camera housing for also indicating to the operator that the camera is not ready for proper operation because a take-up cartridge is lacking.

The novel features which are considered as characteristic of the invention are set forth in particular in the appended calims. The camera itself, however, both as to its consrtuction and its mode of operation, together with additional features and advantages thereof, will be best understood from the following description of specific embodiments when read in connection with the accompanying drawings, in which:

FIG. 8 shows in a fragmentary sectional partly diagrammatic plan view a further embodiment of a structure which in accordance with the invention cooperates with a light-measuring means to indicate to the operator whether or not the camera is ready for operation;

FIG. 9 is a fragmentary perspective illustration of the manner in which the invention is applied to a scanning structure of a camera for indicating to the operator whether or not the camera is ready for proper operation;

FIG. 15 shows a further embodiment of the invention for rendering a portion of a pointer of a light meter visible or invisible depending upon whether or not a proper supply cartridge is situated in the camera housing;

FIG. 16 shows how a scanning structure is influenced in accordance with the invention to indicate to the operator whether or not a proper supply cartridge is in the camera;

FIG. 17 shows how a structure for controlling the access of light to a photosensitive element of a light-measuring means is controlled in accordance with whether or not a proper supply cartridge is in the camera housing;

FIG. 18 indicates in an elevation view the structure of the element of FIG. 17 which controls the access of light to the photosensitive element of the light-measuring means;

FIG. 19 is a fragmentary partly sectional plan view illustrating how the circuit of a light-measuring means is controlled in accordance with whether or not a proper supply cartridge is situated in the camera housing; and FIG. 20 shows another embodiment of a structure for influencing an electrical circuit so as to indicate to the operator whether or not a proper supply cartridge is situated in the camera housing.

Figure 1:
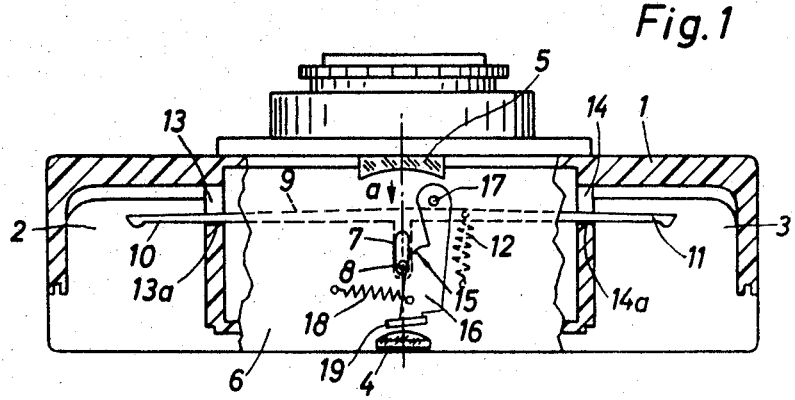
FIG. 1 is a partly sectional top plan view illustrating one possible embodiment of a structure for indicating to the operator whether or not supply and take-up cartridges are situated in the camera housing.

Referring now to FIG. 1 there is shown therein a camera housing 1 which is provided with a known, unillustrated rear cover capable of being moved to and from a position on the camera housing 1 closing the chambers 2 and 3 which are respectively adapted to receive the cartridges for the film, these cartridges being of the type in which the film is coiled without being carried by a rotary film spool. The camera housing also carries a viewfinder means which includes the viewfinder ocular 4 and the viewfinder objective 5. In the interior of the camera housing is situated a plate 6 which is formed with an elongated slot 7 which extends parallel to the optical axis of the viewfinder means, and this slot 7 receives a pin 8 which is thus guided for straight-line movement back and forth parallel to the optical axis in the slot 7. The pin 8 is fixedly carried by a feeler lever means 9 which has a pair of arms 10 and 11 which respectively extend through housing slots 13 and 14 into the chambers 2 and 3. A spring 12 is operatively connected to the lever 9 so as to urge the latter to move rearwardly in the direction of the arrow *a* until both of the arms 10 and 11 engage the rear ends 13*a* and 14*a* of the slots 13 and 14, respectively, and in this way the position of the lever means 9 when there are no cartridges in the cartridge chambers is determined.

Figure 2:
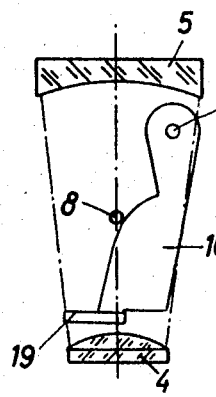
FIG. 2 is a top plan view, on an enlarged scale, as compared to FIG. 1, of the indicating structure of FIG. 1.
Figure 3:
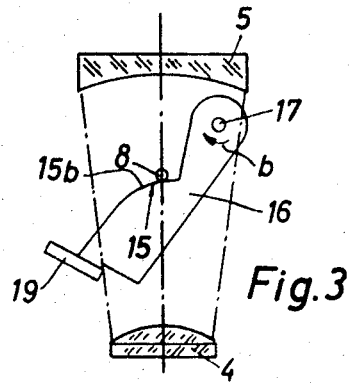
FIG. 3 shows the structure of FIG. 2 in a different position.

The pin 8 is engaged by a camming edge 15 of a lever 16 which forms part of an indicating means for indicating to the operator whether or not the camera is ready for operation, and this indicating lever 16 is supported for pivotal movement by a stationary pin 17. The camming edge 15 is maintained in engagement with pin 8 by a spring 18 which acts on the lever 16 to urge the latter to turn in a clockwise direction, as viewed in FIGS. 1–3. This indicating lever 16 carries an indicating or warning flag 19 which is visible in the viewfinder means 4, 5 when the lever 16 is in a position such as that indicated in FIGS. 1 and 2.

In the position of the parts shown in FIG. 1, both of the cartridge chambers are empty, so that in this position the pin 8 is located by the spring 12 adjacent the rear end of the slot 7, so that the pin 8 acts on lever 16 in opposition to the spring 18, which is weaker than the spring 12, so as to maintain the lever 16 in the position illustrated in FIG. 1 where the warning flag 19 is fully visible in the viewfinder and extends through the optical axis of the viewfinder, this optical axis extending substantially centrally through the warning flag 19 in the position of the parts shown in FIG. 1. Assuming now, for example, that a cartridge is introduced into the chamber 2, then of course the lever 9 will turn in a clockwise direction about a pivot axis determined by engagement of the arm 11 with the end of slot 14 shown at 14*a*, and as a result the warning flag 19 shifts to the left, as viewed in FIG. 1, to assume the position indicated in FIG. 2, the pin 8 being displaced at this time through a relatively short distance forwardly from the position shown in FIG. 1. The operator will now detect, when looking through the viewfinder means 4, 5, that the warning flag covers only one half the field of view of the viewfinder, and therefore the operator is made aware of the fact that only one cartridge has been introduced into the camera. When the operator introduces the second cartridge into the camera, then the lever 9 will turn about the axis formed by the free end of the arm 10 and the cartridge which is already in the chamber 2, and now the pin 8 will be moved through a further distance forwardly, in a direction opposite to that indicated by the arrow $a$, along the slot 7, so that the pin 8 assumes with respect to the lever 16 the position indicated in FIG. 3 where the portion 15$b$ of the camming edge 15 engages the pin 8, and in this position in the spring 18 has been capable of turning the indicating lever 16 in the direction of the arrow $b$ of FIG. 3 to a position where the warning flag 19 is situated completely beyond the field of view of the viewfinder, so that when the operator looks through the viewfinder and receives no warning signal the operator knows that the camera is ready for proper operation.

Thus, it will be seen that with this exceedingly simple construction which includes only a small number of moving components it is possible to provide an indication as to whether or not the camera is ready for operation with cartridges in each of the chambers.

Figure 4:
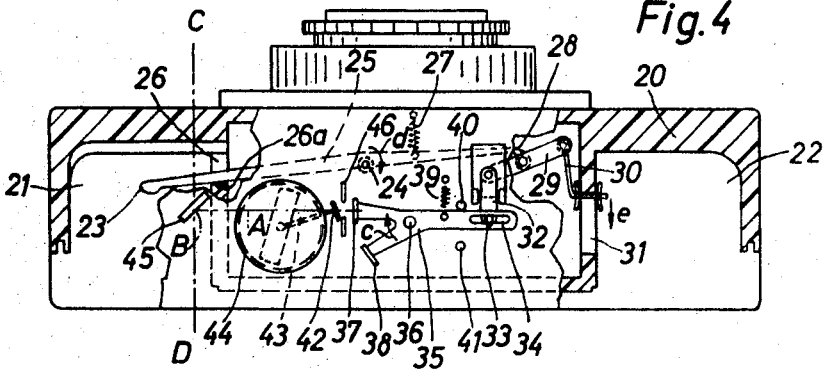
FIG. 4 is a partly sectional top plan view of another embodiment of a structure of the invention for indicating to the operator whether or not the camera is ready for operation with a pair of cartridges in the camera housing.

The embodiment which is illustrated in FIG. 4 also includes a camera housing 20 provided with a pair of cartridge chambers 21 and 22 capable of being closed when a conventional unillustrated cover is mounted on the rear of the camera housing. The arm 23 of a feeler lever 25, which is pivotally mounted on a pivot pin 24, extends through a slot 26 of the camera housing into the interior of the cartridge chamber 21. A spring 27 is operatively connected to the lever 25 and urges the arm 23 thereof into engagement with the rear end 26$a$ of the slot 26. The other arm 28 of the lever 25 pivotally carries an intermediate motion-transmitting lever 29. One end of this lever 29 is pivotally connected with an angularly bent feeler 30 which extends through a slot 31 of the camera housing into the cartridge chamber 22. The feeler 30 is so constructed that it is capable of cooperating with a projection carried by the exterior of the supply cartridge, this projection being indicative of the speed of the film in the cartridge. This latter projection of the supply cartridge is preferably used also for the purpose of automatically adjusting the exposure-determining structure of the camera in accordance with the film speed. The other end of the intermediate lever 29 is pivotally connected with a link 32 which carries a pin 33 which is received in an elongated slot 34 which is formed in a lever 35 which is supported for turning movement by a stationary pin 36 and which carries a pair of light-blocking elements 37 and 38 capable of extending into a predetermined path of light for blocking the movement of light along this path, these light-blocking elements 37 and 38 of course being opaque. A spring 39 is operatively connected to the blocking lever 35 in order to urge the latter into engagement with a stop 40 in the form of a stationary pin carried by the camera housing in the interior thereof. The turning of the lever 35 in the direction of the arrow $c$ is limited by a second stop 41.

The parts are shown in FIG. 4 in the rest position which they assume when there are no cartridges in the chambers 21 and 22. In this rest position the spring 39 maintains the lever 35 in engagement with the stop pin 40. In this position the light-obstructing element 37 extends into the path of light which passes through a space between a pair of stationary light-blocking elements 46, the light moving along the path A–B through the space between the elements 46, as indicated in FIG. 4. Thus, since the light-blocking element 37 is in alignment with the space between the elements 46 light cannot move, from right to left, as viewed in FIG. 4, through the gap between the elements 46. When light does move along the path A–B, it will render an image of a portion 42 of a pointer 43 of a moving coil instrument 44 visible along the viewfinder axis C–D. The image of the pointer portion 42 is directed by the path of light onto the semi-transparent reflector 45 of the viewfinder means. Therefore, with the structure of FIG. 4 when there are no cartridges in the camera the operator will know when looking through the viewfinder that the camera is not ready for operation because, instead of seeing an image of the portion 42 of the pointer 43 of the moving coil instrument 44 the operator will simply see a dark area, assuming that element 37 is opaque. Of course, this element 37 may be transparent and may have a certain color so that when the operator sees the area of the viewfinder provided with this color the operator can also know that the camera is not ready for proper operation.

Assuming now that the operator introduces a cartridge into the chamber 21, then the feeler lever 25 will turn about the pin 24 in the direction of the arrow $d$. Inasmuch as the blocking lever 35 is held by the spring 39 in the position shown in FIG. 4, the turning of the lever 25 at this time results only in movement of the feeler 30 in the direction of the arrow $e$. Therefore, the light-blocking element 37 still remains in the light path A–B. When the supply cartridge is introduced into the chamber 22, the feeler 30 will be displaced back toward the position shown in FIG. 4, in a direction opposite to that indicated by the arrow $e$. At this time, since the feeler lever 25 is held to the position in which it has been initially turned by the cartridge introduced into the chamber 21, the lever 29 will turn in a counterclockwise direction, as viewed in FIG. 4. This turning of the lever 29 will result, through the pin-and-slot connection 33, 34 between the link 32 and the lever 35 in a turning of the lever 35 in the direction of the arrow $c$, so that the light-blocking element 37 is now displaced away from the light path A–B. When the operator now looks through the viewfinder he will see the image of the pointer portion 42 and will know that a pair of cartridges have been properly introduced into the chambers 21 and 22.

If, instead of first introducing a cartridge into the chamber 21, a cartridge is first introduced into the chamber 22, then there simply will be no movement of the totalizing transmission shown in FIG. 4 inasmuch as the feeler 30 will remain at the forward end of the slot 31, in the position indicated in FIG. 4. The system of levers 25, 29, 32 and 35 forms a totalizing transmission inasmuch as the movement of the arm 23 by one cartridge is added to the movement of the feeler 30 by the other cartridge in order to displace the light-blocking element 37 from its blocking position. Therefore, the light-blocking element 37 will remain in its blocking position illustrated in FIG. 4 if a supply cartridge is first introduced into the chamber 22. Only during subsequent introduction of a take-up cartridge into the chamber 21 will the feeler 30 be displaced into engagement with the projection of the supply cartridge which indicates the film speed, and of course the lever 35 will be turned in the manner described above so as to dispace the light-blocking element 37 from the light path.

The particular camera shown in FIG. 4 is designed to handle a given range of film speeds. When a cartridge with film within this range of film speeds is introduced into the chamber 22, the projection of this cartridge will position the feeler 30 somewhere between and spaced from the ends of the slot 31. However, if the film speed in the cartridge is beyond the range of film speeds which can be handled by the camera, then the projection of the cartridge either will not displace the lever 30 from the rear end of the slot 31, assuming that a cartridge has initially been placed in the chamber 21, if the film speed is beyond one end of the proper range of film speeds, or the projection of the cartridge will displace the lever 30 all the way back to the position shown in FIG. 4 if the film speed is beyond the other end of the proper range of film speeds which can be handled by the camera, so that when a cartridge with a film speed beyond that which can be handled by the camera is introduced into the chamber 22 the feeler 30 will engage or be in the immediate vicinity of one or the other of the ends of the slot 31. Of course, assuming that a cartridge has initially been placed in the chamber 21 and that the projection on the supply cartridge is located so that it does not even displace the feeler 30 back toward the position shown in FIG. 4, then the light-blocking element 37 will simply remain in the position illustrated in FIG. 4 and the feeler 30 will remain in engagement with the rear end of the slot 31, so that in this way the operator will receive the same signal as when there is no cartridge in the chamber 22. On the other hand, if the film speed is beyond the other end of the range of acceptable film speeds, then the projection of the supply cartridge will displace the feeler 30 all the way back to the position shown in FIG. 4, or at least almost all the way back to the position shown in FIG. 4, and the result will be that the blocking lever 35 will turn so far in the direction of the arrow c that the light-blocking element 38 will now be situated in the light path A–B, and since this light-blocking element 38 is of the same construction as the light-blocking element 37 the operator will again see in the viewfinder the same signal as that which is received when there is no cartridge in the chamber 22.

Therefore, with the embodiment of FIG. 4 not only does the structure provide an indication of whether or not both cartridges are in the camera, but in addition a signal is given when the particular film speed of the supply cartridge is beyond the acceptable range of film speeds for the particular camera.

Figure 5:
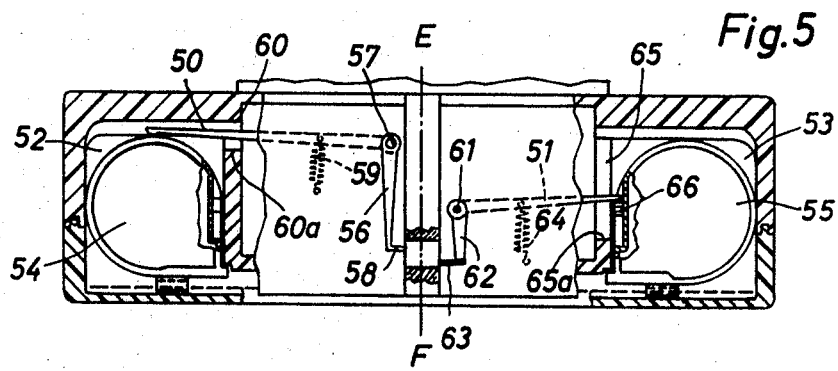
FIG. 5 is a fragmentary partly sectional top plan view of still another embodiment for indicating to the operator whether or not cartridges are properly situated in the camera housing so that the camera is ready for operation.

FIG. 5 shows another possible structure according to the present invention for providing a mechanical warning signal. In this case there are a pair of feeler levers 50 and 51 which extend into the chambers 52 and 53, respectively, which respectively receive the take-up cartridge 54 and the supply cartridge 55, FIG. 5 also showing the cover locked in position so that the cartridges 54 and 55 are maintained in the chambers 52 and 53, respectively, as shown in FIG. 5. The feeler lever 50 is fixed to a rotary shaft 57 which is in turn fixed to an indicating lever 56 which carries a warning flag 58. This warning flag 58 is adapted to cover the left half of the viewfinder means which has the optical axis E–F. A spring 59 is operatively connected to the lever 50 to urge it into engagement with the end 60a of a slot 60 in the camera housing through which the lever 50 extends into the chamber 52.

The lever 51 is fixed to a rotary shaft 61 which is in turn fixed to an indicating lever 62 which carries a warning flag 63 which is adapted to enter into the field of view of the viewfinder at a portion thereof situated to the right of the optical axis E–F. A spring 64 is operatively connected to the lever 51 to urge the latter into engagement with the rear end 65a of a slot 65 through which the feeler lever 51 extends into the supply cartridge chamber 53. The feeler 51, instead of simply being engaged by the exterior surface of the cartridge, as is the case with the feeler lever 50, is engaged by the projection 66 of the cartridge 55, this projection 66 having on the cartridge 55 a position which is indicative of the speed of the film in the cartridge 55, and of course this projection 66 can also be used for automatically setting a light-measuring structure of the camera in accordance with the speed of the film in the cartridge 55.

In the position of the parts shown in FIG. 5 the lever 50 has been displaced by the exterior surface of the cartridge 54 and the lever 51 has been displaced by the projection 66 through such a distance that both of the warning flags 58 and 63 are situated beyond the field of view of the viewfinder, and thus the operator will not be given any signal that anything is wrong and he can simply proceed to make proper exposures. However, when the cartridges 54 and 55 are removed, then the springs 59 and 64 will return the levers 50 and 51 to positions engaging the ends 60a and 65a of the slots 60 and 65, respectively, so that in this case both of the warning flags 58 and 63 will be visible in the viewfinder means.

Therefore, with this embodiment there is an extremely simple construction which permits the operator to know very accurately which cartridge is lacking, inasmuch as a warning flag will appear only on that side of the axis E–F where the cartridge is missing.

Figure 6:
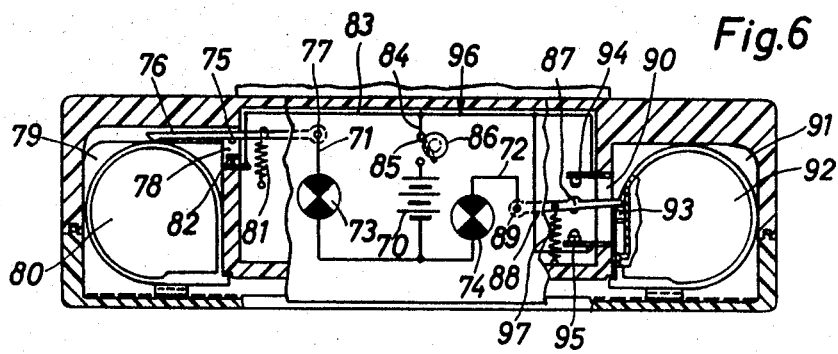
FIG. 6 shows in a fragmentary diagrammatic partly sectional plan view yet another embodiment of a structure for indicating to the operator whether or not the camera is ready for operation.

The embodiment of the invention which is illustrated in FIG. 6 is particularly suitable for use with cameras which include a battery either for the purpose of driving an electrical motor which is used for transporting film or for the purpose of supplying current for a flash assembly, and the embodiment of FIG. 6 provides an electrical indication of whether or not the camera is ready for operation. This embodiment includes a source of current 70 to one pole of which is connected a pair of parallel circuit branches 71 and 72 which respectively are provided with the electrical signalling devices 73 and 74. These electrical signalling devices 73 and 74 which are connected in the parallel-connected branches 71 and 72 of the circuit may take the form of lamps, relays, or simple measuring instruments such as moving coil instruments or the like, such instruments being used to control the position of a signalling flag which is rendered visible when a cartridge is lacking or when a supply cartridge with an improper film speed is used, as described below. The indicating devices 73 and 74 can be situated behind windows mounted in an outer wall of the camera or they can be rendered visible in the viewfinder. The circuit branch 71 is electrically connected with a contact 75 carried by a feeler lever 76. This feeler lever 76 is supported for turning movement by a stationary pivot pin 77 and extends through a slot 78 into the chamber 79 for the take-up cartridge 80. A spring 81 is operatively connected to the lever 76 and seeks to turn the lever 76 in a counterclockwise direction, as viewed in FIG. 6 until the contact 75 engages a stationary contact 82 situated at the rear end of the slot 78. This contact 82 is electrically conected through the conductors 83 and 84 with the other pole of the battery 70. The conductor portion 84 of the circuit, this conductor portion being common to both branches 71 and 72, is provided with an interruptor switch 85 which is capable of being closed by a frustoconical portion of a shutter release plunger 86 which, when depressed to release the shutter, moves the switch 85 to its closed position, this switch 85 being a normally open switch which automatically assumes its open position when the shutter-release plunger 86 is in its position of rest.

The branch 72 of the circuit is electrically connected with a contact 87 which is carried by a second feeler lever 88 which is supported for turning movement by a stationary pivot pin 89 and which extends through a slot 90 of the camera housing into the chamber 91 which receives the supply cartridge 92. This feeler lever 88 is arranged in such a way that it will engage the projection 93 which is indicative, by its position on the cartridge 92, of the speed of the film therein, and this projection 93 can also be used for adjusting the camera to take into account the speed of the film in the cartridge 92. The contact 87 carried by the feeler lever 88 is situated between a pair of stationary, springy contacts 94 and 95 respectively situated at the ends of the slot 90 and connected by a conductor 96 with the conductor 84. The feeler lever 88 is urged by a spring 97 in a clockwise direction, as viewed in FIG. 6, so that when there is no cartridge 92 in the chamber 91 the contact 87 will engage the contact 95.

In the position of the parts shown in FIG. 6, the circuit branch 71 is maintained open because the contact 75 is spaced from the contact 82, and the circuit branch 72 is also maintained open because the contact 87 is situated between and spaced from the contacts 94 and 95, so that even when the operator does depress the shutter-releasing plunger 86 to make an exposure and to close the switch 85 the signal devices 73 and 74 will not be energized and therefore they will not give any signal of any improper condition of the camera. However, when the cartridge 80 is lacking from the chamber 79 the contact 75 does engage the contact 82, and now when the operator depresses the plunger 86 the switch 85 upon closing will energize the signalling device 73 so that the operator will know that there is no cartridge in the chamber 79. The frustoconical surface which actuates the switch 85 is positioned on the shutter release plunger 86 at the location which closes the switch 85 before the shutter is actually tripped to make an exposure, so that when the operator sees that the signalling device 73 has been energized the operator will simply release the plunger 86 before an exposure is made. In the same way, when there is no cartridge 92 in the chamber 91 the contact 87 engages the contact 95, and upon actuation of the plunger 86 the switch 85 will close to energize the signalling device 74 so as to warn the operator that there is no cartridge in the chamber 91. Thus, with this construction the signalling devices 73 and 74 respectively warn the operator as to whether or not there are cartridges in the chambers 79 and 91.

The camera of FIG. 6 is also designed to handle film speeds within predetermined range. If the position of the projection 93 is indicative of a film speed which is beyond this range, then the structure of FIG. 6 will also cause the signalling device 74 to be energized so as to warn the operator that something is wrong. Thus, if the film speed is beyond one end of the acceptable range of film speeds the contact 87 will simply remain in engagement with the contact 95 since the projection 93 will not even move the feeler lever 88 from the position in which it is maintained by the spring 97 when there is no cartridge 92 in the chamber 91, and thus the device 74 will be energized when the operator actuates the shutter-releasing plunger 86. On the other hand, if the film speed is beyond the other end of the acceptable range of film speeds then the projection 93 will displace the feeler lever 88 so far that its contact 87 will engage the contact 94, and in this case also the signalling device 74 will be energized when the operator seeks to trip the shutter, and thus in both of these cases the signalling device 74 will provide a warning signal so that if the operator does indeed find a cartridge 92 in the chamber 91 the operator will know that the film speed of the film in this cartridge is beyond the range which can be properly exposed in the camera.

Thus, the embodiment of FIG. 6 is capable of indicating on the one hand which one of the cartridges is missing and on the other hand, in the case of te supply cartridge, if the speed of the film in this latter cartridge is beyond the range which can be properly handled by the camera.

Figure 7:
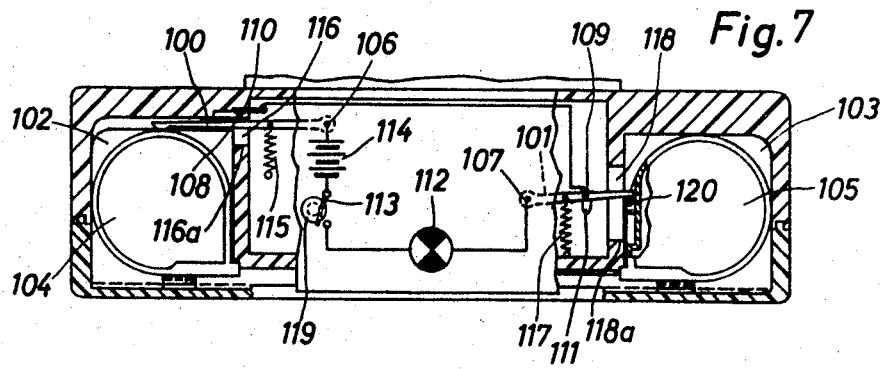
FIG. 7 is a diagrammatic fragmentary partly sectional plan view of a further embodiment of a structure according to the present invention for indicating to the operator whether or not the camera is ready for proper operation.

Referring now to FIG. 7, there is indicated therein a somewhat simpler electrical structure for providing electrical signals as to the condition of the camera. The embodiment of FIG. 7 includes, in the same way as the embodiment of FIG. 6, a pair of feeler levers 100 and 101 which extend into the chambers 102 and 103, respectively, of the camera housing. The chambers 102 and 103 respectively receive the take-up cartridge 104 and the supply cartridge 105 which are held in position by the cover of the camera housing, as indicated in FIG. 7, and of course the cartridge 104 will displace the lever 100 about the pivot pin 106 to the position illustrated in FIG. 7, this lever 100 extending through a slot 116 of the camera housing into the chamber 102 and being urged by a spring 115 into engagement with the end 116a of the slot 116. This lever 100 carries a contact 108 which engages a contact 110 when a cartridge 104 is in the chamber 102, as indicated in FIG. 7. The lever 101 is supported for turning movement by a stationary pin 107 and extends through a slot 118 of the camera housing into the chamber 103 where this lever 101 is engaged by the projection 120 of the cartridge 105, this projection of course being indicative, by its position on the cartridge 105, of the speed of the film therein. A spring 117 urges the lever 101 to turn into engagement with the rear end 118a of the slot 118, and the lever 101 carries a contact 109 which is capable of sliding along a stationary elongated contact 111. In the position of the parts shown in FIG. 7 the contact 109 is situated between the ends of and engages the contact 111. The switches 108, 110 and 109, 111 are connected through a suitable circuit in series with each other as well as with the electrical indicating device 112 and the source of current 114, and also with the interruptor switch 113 which is capable of being actuated by a frustoconical surface of the shutter-release plunger 119 in the same way that the switch 85 of FIG. 6 is actuated by the shutter release plunger 86.

Assuming that there are no cartridges in the chambers 102 and 103 of FIG. 7, then the spring 115 will hold the lever 100 in engagement with the end 116a of the slot 116 so that the contact 108 is spaced from the contact 110, and thus the circuit is open, and of course when there is no cartridge 105 in the chamber 103 the spring 117 holds the lever 101 in engagement with the end 118a of the slot 118 so that the contact 109 is spaced from the contact 111, and at this switch also the circuit is maintained open at this time.

If, as shown in FIG. 7, both of the chambers 102 and 103 are occupied by cartridges 104 and 105, then of course both of the switches 108, 110 and 109, 111 are closed, so that when the operator depresses the plunger 119 the switch 113 will close and the indicating device 112 will be energized to give to the operator an indication that everything is in order. On the other hand, if either one of the cartridges 104 and 105 is lacking, then either the switch 108, 110 or the switch 109, 111 will be open, so that when the operator depresses the plunger 119 and closes the switch 113 the device 112 will not be energized and the operator will therefore know that something is wrong.

In the event that the cartridge 105 contains a film whose film speed is beyond the range which can be handled by the light-measuring structure of the camera, then when such a cartridge 105 is introduced into the chamber 103 either the lever 101 will not be turned through a distance sufficient to place the contact 109 in engagement with the contact 111 or the lever 101 will be turned through such a great distance that the contact 109 will move all the way across and beyond the contact 111, so that in either one of these cases the circuit will be open and the device 112 will not be energized so that in this way also the operator will be warned against making an exposure.

According to the embodiment of the invention which is illustrated in FIG. 8, the camera housing 130 is formed with a pair of chambers 131 and 132 which are adapted respectively to receive take-up and supply cartridges, and in fact a supply cartridge 133 is shown in FIG. 8 in the chamber 132. The housing 130 is formed with a slot 134 through which a feeler lever 135 extends into the chamber 131, and this lever 135 is supported for turning movement by a stationary pivot 136. A spring 137 is operatively connected to the lever 135 for placing the latter in engagement with the rear end 134a of the slot 134 when there is no cartridge in the chamber 131. The lever 135 carries an electrical contact 138 which engages a stationary contact 139 when the lever 135 is displaced forwardly by a cartridge in the chamber 131. The switch 138, 139 is electrically connected in series with a photosensitive resistor 140 as well as with a fixed resistor 141 and a source of current 142 as well as a moving coil instrument 143, all of these components being electrically connected in series by the circuit 152.

The housing 130 is also formed with a slot 144 through which a feeler lever 145 extends into the chamber 132, and the lever 145 is supported for turning movement about a stationary pin 146. The lever 145 carries an electrical contact 147 which is situated between a pair of spaced stationary contacts 148 and 149. As is apparent from FIG. 8, when the contact 147 engages either the contact 149 or the contact 148 the instrument 143 will be short-circuited. The feeler lever 145 engages a projection 150 of the cartridge 133, this projection, by its position on the cartridge, being indicative of the speed of the film therein, and this projection can be used to automatically set the factor of the film speed into the camera.

If the chamber 131 is empty, as shown in FIG. 8, then the feeler lever 135 is in the illustrated position engaging the rear end 134a of the slot 134 so that the contact 138 is spaced from the contact 139, and therefore the measuring circuit 152 is open. The pointer of the moving coil instrument 143 is therefore in its end position, and this pointer may either be visible from the exterior of the camera or may be rendered visible in the viewfinder, so as to give a warning, by its location in its end position, that an exposure should not be made. This arrangement may also be used with a scanning structure, as shown, for example, in FIG. 9 and described below.

If, as shown in FIG. 8, there is a supply cartridge 133 in the chamber 132, and the projection 150 is indicative of a film speed which is within the range of film speeds which can be handled by the light measuring structure of the camera, then the feeler lever 145 is displaced to a position where the contact 147 is situated between and spaced from the contacts 148 and 149. In this case no current can flow through these latter contacts. Now if the take-up cartridge is introduced into the chamber 131 the switch 138, 139 will close and the circuit 152 will be closed so that the pointer of the moving coil instrument 143 will assume a position which is indicative of the intensity of the light which impinges on the photosensiitve resistor 140.

On the other hand, if there is a cartridge in the chamber 131 but there is no cartridge in the chamber 132, then the spring 151 will turn the lever 145 so as to place the contact 147 in engagement with the contact 149. The result is that the moving coil instrument 143 is short-circuited, so that its pointer will remain in this case also in its end position from which it will not move, and the pointer will maintain its end position even though the contacts 138 and 139 engage each other, so that the operator is again warned against making an exposure.

Assuming that the supply cartridge 133 which is introduced into the chamber 132 carries a projection 150 whose position is indicative of a film speed which is beyond the range of film speeds which can be handled by the light-measuring structure of the camera, then if this particular film speed is beyond one end of the acceptable range of film speeds the contact 147 will simply remain in engagement with the contact 149, while if it is beyond the other end of the acceptable range of film speeds the projection 150 will displace the lever 145 through a distance sufficiently great to place the contact 147 in engagement with the contact 148. In either of these cases the instrument 143 is short-circuited, so that the pointer of the instrument will remain in its initial position, thus warning the operator against making an exposure.

The particular advantage of the embodiment of FIG. 8 resides in the fact that use is made of an indicating device which is already present in the camera for the purpose of indicating the light intensity, so that with this embodiment it is not necessary to add to the camera a special warning structure.

In the embodiment of the invention which is illustrated in FIG. 9, the light-measuring means includes a moving coil instrument 160 which is provided with a pointer 161 which is adapted to be scanned. This pointer 161 is located adjacent to but is freely movable over an anvil 162 which is formed with an elongated slot 163. The scanning plate 164 is capable of moving through the slot 163 and has a scanning edge 165 which is directed toward the pointer 161. The scanning plate 164 is provided at the opposite ends of the scanning edge 165 with portions 166 and 167 capable of being engaged by the pointer 161 when the latter is in extreme end positions so as to prevent downward movement of the scanning plate 164 when the light intensity is beyond an acceptable range for the particular camera. The scanning plate 164 is fixed with an elongated arm 168 which by a pin-and-slot connection is operatively connected with a rotary adjusting ring 169 capable of adjusting, in a manner well known in the art, either the exposure time and/or the diaphragm, and a spring 172 is operatively connected to the scanning plate 164 for urging it downwardly in the scanning direction f, this downward movement resulting in turning of the ring 169 so as to automatically adjust the exposure time and/or the aperture. In order to hold the scanning plate 164 in its upper rest position shown in FIG. 9, the shutter release plunger 170 is provided with a pin 173 which extends beneath and engages a pin 174 fixed to the plate 164, and a return spring 171, which is stronger than the spring 172, urges the plunger 170 upwardly to the illustrated rest position thereof where through the pins 173 and 174 the plunger 170 maintains the plate 164 in its rest position where the pointer 161 is free to move to whatever angular position is called for by the lighting conditions.

The scanning plate 164 is also connected with an elongated arm 175 provided along one edge with a camming portion 176 engaged by a lever 178 which is turnable about a stationary pin 177, a spring 179 being connected to the lever 178 so as to maintain it in engagement with the camming edge 176. The lever 178 carries a pair of differently colored indicating elements 180 and 181 capable of being alternately situated along the optical axis G–H of a viewfinder or the like, the elements 180 and 181 only being required to be rendered alternately visible to the operator when the operator views along the light path G–H.

The anvil 162 carries a pivot pin 182 about which a blocking lever 183 is turnable. This blocking lever 183 is connected by a pin-and-slot connection 184, 185 with a slide member 186 which is longitudinally shiftable in stationary guides 187 of the camera. The slide member 186 is formed with a bore receiving a pin 188 carried by an intermediate lever 189 which is pivotally connected to the slide member 186 by the pin 188. This lever 189 is formed at its ends with a pair of slots 190 and 191 which respectively receive pins 192 and 193 which are respectively carried by motion transmitting levers 194 and 195. These levers 194 and 195 are fixed to rotary shafts 197 and 198 supported for rotation by stationary camera bearings 196 and also fixedly connected with a pair of feeler levers 199 and 200, respectively. A pair of springs 201 and 202 are respectively connected to the feeler levers 199 and 200 so as to urge them into engagement with the stationary stop pins 203 and 204, respectively. These feeler levers 199 and 200 extend in a manner which is not illustrated in FIG. 9 into chambers of the camera housing which respectively receive the supply cartridge 205 and the take-up cartridge 206. The feeler lever 200 is engaged by the exterior surface of the take-up cartridge 206, while the feeler lever 199 is engaged by the projection 207 of the cartridge 205, this projection 207 by its position on the cartridge 205 indicating the speed of the film therein.

Assuming that both of the cartridges 205 and 206 are in the camera housing and that the projection 207 indicates a film speed which is capable of being handled by the light-measuring means of the structure of FIG. 9, then the parts are in the position shown in FIG. 9. When the shutter-release plunger 170 is depressed, the scanning plate 164 can be moved downwardly by the spring 172 in the direction of the arrow f until its scanning edge 165 engages the pointer 161 which is in a positon determined by the light intensity. During this movement the ring 169 is adjusted by being turned in the direction of the arrow g, so as to automatically determine the extent to which the film in the camera will be exposed, and on the other hand the camming portion 176 moves in the direction of the arrow *f* so as to turn the lever 178 about the pin 177 through a distance sufficient to displace the indicator 180 beyond the light path G–H and instead to situate in this light path the indicator 181. When the operator sees the color provided by the indicator 181 the operator knows that it is possible to make proper exposures.

Assuming now that the take-up cartridge 206 is removed, then the spring 202 can displace the lever 200 into engagement with the stop 204. This turning of the lever 200 is transmitted through the shaft 198 and the lever 195 through the pin-and-slot connection 191, 193 and the intermediate lever 189 to the slide member 186. This slide member 186 therefore moves at this time in the direction of the arrow *h*, and this movement provides through the pin-and-slot connection 184, 185 a turning of the blocking lever 183 in the direction of the arrow *i* about the pin 182. As a result the blocking arm 183a of the blocking lever 183 becomes situated beneath the portion 166 of the scanning plate 164, so that if under these conditions the operator depresses the shutter-release plunger 170, the scanning plate 164 cannot move in the direction of the arrow *f*. This blocking of the operation of the scanning means is rendered apparent to the operator because the color provided by the indicator 180 is visible when the operator views along the light path G–H. Of course, instead of or in addition to this indication it is possible also to block the shutter release plunger against operation in a known manner.

If the supply cartridge 205 is removed, then the spring 201 will turn the lever 199 against the stop 203 so that the transmission of FIG. 9 will again displace the slide member 186 forwardly in the direction of the arrow *h*, providing a blocking of the scanning means in the same way as when the take-up cartridge 206 is not present.

Assuming that the cartridge 205 contains a film whose speed is beyond the range which can be accepted by the light-measuring means of FIG. 9, then when the cartridge 205 is introduced into the camera either the projection 207 will not turn lever 199 away from the pin 203, in the event that the film speed is located beyond one end of the acceptable range of film speeds, so that the same blocking will take place as when there is no supply cartridge in the camera, or the projection 207 will turn the lever 199 in the direction of the arrow *k*, through such a large distance that the transmission of FIG. 9 will move the slide member 186 rearwardly, in the direction opposite to that indicated by the arrow *h*, through a distance sufficient to turn the lever 183 in a direction opposite to that indicated by the arrow *i* through an angular distance sufficient to place the other blocking arm 183b beneath the portion 166 of the scanning plate 164, so that in this case also the scanning plate 164 will be blocked against movement in the direction of the arrow *f*, and the indicator 180 will remain visible to the operator so as to indicate that a proper exposure cannot be made. Of course, in this case also it is possible to block the shutter release plunger 170 against operation in order to indicate that a proper exposure cannot be made.

Thus, with the embodiment of FIG. 9 it is also possible to indicate by blocking of a part of the camera which the operator seeks to move in connection with the making of an exposure or by blocking an indicating means that either one or both cartridges are not present or the film speed is such that a proper exposure cannot be made.

Figure 10:
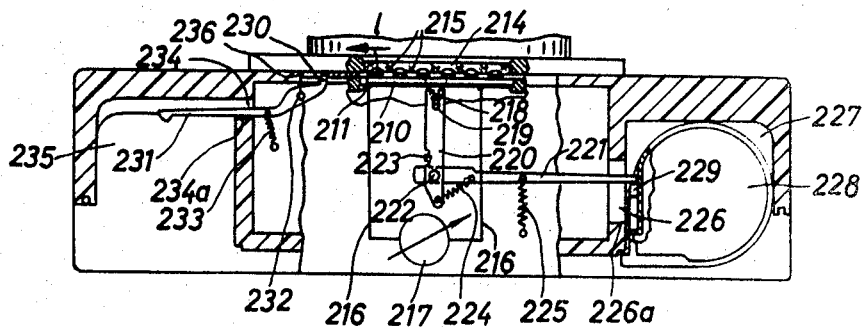
FIG. 10 shows an embodiment of the invention which cooperates with a photosensitive element of a light-measuring means for indicating to the operator whether or not the camera is ready for proper operation.
Figure 11:
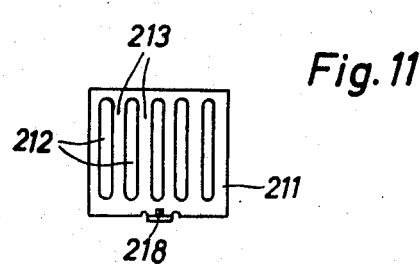
FIG. 11 shows in elevation an adjustable cover of FIG. 10 which controls the access of light to the photosensitive element.

In the embodiment of the invention which is illustrated in FIG. 10 the pointer of a moving coil instrument of the light-measuring means is again maintained in the position indicating insufficient light for making a proper exposure, as was the case with FIG. 8, but whereas in FIG. 8 this positioning of the pointer was achieved by control of the electrical circuit, in FIG. 10 this was also achieved by controlling the access of light to a photosensitive element of the light-measuring means. In this case a photosensitive element 210 is provided, and a cover means 211 is situated in front of the photosensitive element 210. The cover means 211 is shiftable between positions covering and uncovering the photosensitive element 210 so as to control the access of light thereto, and, as is shown in FIG. 11, the cover means 211 is in the form of a slidable plate formed with a plurality of elongated parallel slots 212 which define between themselves elongated opaque plate portions 213, so that the cover means 211 has a grid-shaped configuration. Preferably the width of the slots 212 is equal to the width of the elongated light-blocking portions 213. The camera housing carries in front of the shiftable cover means 211, and thus in front of the photosensitive element 210, a honeycomb lens 214 which at its rear surface which is directed toward the cover means 211 is provided with a plurality of opaque ribs 215 which extend parallel to and which have the same width as the slots 212, these ribs 215 being spaced from each other by the same distance as the opaque elongated portions 213 of the cover 211. The photosensitive element 210 is in a known way connected into an electrical circuit 216 in which the moving coil instrument 217 is also located.

The cover means 211 carries a lug which extends angularly from the plate 211 and which carries a pin 218 which is received in a slot 219 of a motion-transmitting lever 220. The lever 220 is turnable about a stationary pin 222 which also serves to pivotally support a feeler lever 221. The lever 220 carries a lug 223 which acts as a stop for limiting the extent of turning of the lever 221 with respect to the lever 220, a spring 224 being connected between these levers to urge the lever 221 to turn relative to the lever 220 until the lever 221 engages the stop 223 of the lever 220. Thus, the levers 220 and 221 together with the spring 224 form a yieldable feeler lever means. Instead of a yieldable connection between these levers as shown in FIG. 10 it is also possible to provide other types of known yieldable connections between these components. The feeler lever 221 is operatively connected with a spring 225 which seeks to turn the lever 221 against the rear end 226a of a slot 226 which is formed in the camera housing and through which the lever 221 extends into the chamber 227 which receives the supply cartridge 228. This supply cartridge 228 carries the projection 229 which, by its position on the cartridge 228, is indicative of the film speed of the film therein, and the feeler lever 221 engages this projection 229 which of course can also be used for the purpose of automatically setting the structure of the camera which takes into account the speed of the film to be exposed therein.

As is shown in FIG. 10, the cover means 211 is also formed with a cutout which receives a projection 230 at one end of a second feeler lever 231. This feeler lever 231 is supported for rotary movement by a stationary camera pin 232 and is acted upon by a spring 233 which seeks to turn the lever 231 into engagement with the rear end 234a of a slot 234 in the camera housing through which the lever 231 extends into the chamber 235 which receives the take-up cartridge. In the position of the parts shown in FIG. 10, the supply cartridge 228 is in the chamber 227 but there is no take-up cartridge in the chamber 235, so that the lever 231 engages the end 234a of the slot 234 and the end 230 of the lever 231, by extending into an opening of the plate 211, retains this plate 211 in the position illustrated in FIG. 10 where the opaque portions 213 of the plate 211 are aligned with the spaces between the opaque ribs 215 of the honeycomb lens 214, so that in this position of the parts no light can reach the photosensitive element 210 and the pointer of the moving coil instrument 217 remains in an end position where it indicates that a proper exposure cannot be made. If a take-up cartrdige is now introduced into the chamber 235, the lever 231 will be turned sufficiently to displace its end 230 out of the opening of the slidable covering plate 211. Now it is possible for the plate 211 to be shifted in the direction of the arrow *l* until it reaches the stop 236, and in this position the opaque portions 213 of the covering means 211 and the opaque ribs 215 of the honeycomb lens 214 are aligned with each other, respectively, so that the maximum light area is provided for the photosensitive element 210. This movement of the cover means 211 in the direction of the arrow *l* is brought about by counterclockwise turning of the lever 220 by the spring 224, as viewed in FIG. 10, the lever 220 at this time turning until its projection 223 engages the lever 221 and the pin-and-slot connection 218, 219 transmitting the movement of the lever 220 to the cover means 211 to displace the latter up to the stop 236.

When the supply cartridge 228 is removed, the feeler lever 221 will be turned by the spring 225 into engagement with the rear end 226a of the slot 226. The turning of the lever 221 into engagement with the end 226a of the slot 226 by the spring 225 is followed by the lever 220 as the result of the engagement of the stop lug 223 with the lever 221, and this turning of the lever 220 is transmitted through the pin-and-slot connection 218, 219 to the cover means 211 to place the latter also in the position shown in FIG. 10, blocking light from reaching the photosensitive element 210, when there is no cartridge 228 in the chamber 227.

The camera of FIG. 10 is also designed to handle a predetermined range of film speeds, and this construction also is capable of indicating of the operator that a proper exposure cannot be made in the event that the speed of the film in the cartridge 228 is such that it is situated beyond one end or the other end of the acceptable range of film speeds. Thus, in the event that the speed of the film in the cartridge 228 is beyond one end of the acceptable range of film speeds, when the cartridge 228 is introduced into the chamber 227 the projection 229 will not even engage and move the lever 221 so that it will remain in engagement with the end 226a of the slot 226, and thus in the manner described above light will be prevented from reaching the photosensitive element 210 in the same way as when there is no cartridge in the chamber 227. On the other hand, if the speed of the film in the cartridge 228 is beyond the other end of the acceptable range of film speeds, then the lever 221 will be turned to an angle sufficient to displace the cover 211 through a distance which is equal to twice the width of an elongated opaque portion 213, and thus in this case also light will be prevented from having access to the photosensitive element 210.

Furthermore, with the structure of FIG. 10 the position of the lever 221 and thus of the plate 211 will be determined by the position of the projection 229 on the cartridge 228, so that in this way the extent of light passage through which light can reach the photosensitive element 210 is adjusted, and thus an adjustment for the speed of the film is made directly with this construction. In other words, the lever 221 by engaging the projection 229 will control the position of the plate 211 with respect to the honeycomb lens 214 so as to cover or uncover the latter to a predetermined extent which will determine the area through which light can reach the photosensitive element 210, and in this way an adjustment is made for the film speed. Instead of a shiftable covering means 211 as shown in FIG. 11 and described above, it is possible to use other covering structures for blocking through an adjustable extent the passage through which light can reach the photosensitive element 210.

Of course, when there is no cartridge in the chamber 235 and the supply cartridge 238 is initially introduced into the chamber 237, the yieldable lever means 220, 221 will seek to displace the cover 211 in the direction of the arrow *l*, but the extent of displacement will be limited by entering of the projection 230 of the lever 231 into the opening of the plate 211, the spring 233 at this time maintaining the end 230 of the lever 231 against the rear surface of the plate 211 so that the latter slides along the projection 230 until this projection snaps into the opening of the plate which prevents further movement thereof in the direction of the arrow *l*, and thus in this way the spaces between the ribs 215 of the honeycomb lens 214 will not be uncovered until a take-up cartridge is introduced into the chamber 235.

Figure 12:
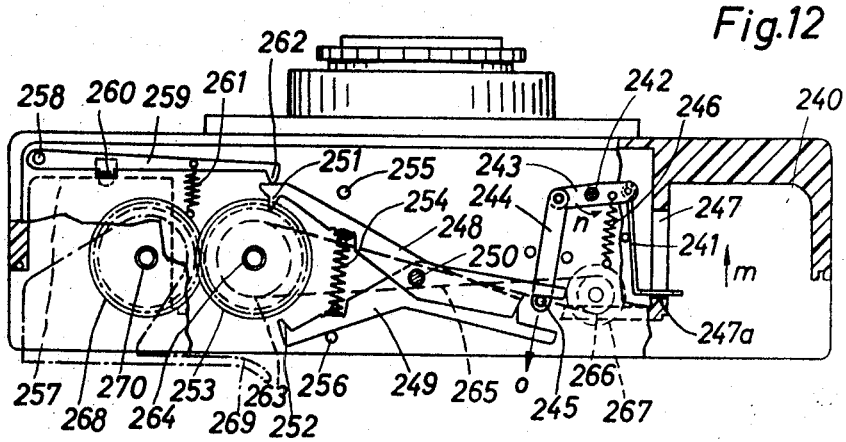
FIG. 12 is a partly sectional and partly diagrammatic plan view of an embodiment of the invention which blocks operation of the film transporting means if supply and take-up cartridges are not properly situated in the camera housing.

The embodiment of the invention which is illustrated in FIG. 12 includes a camera housing which is provided with a chamber 240 for a supply cartridge. A feeler 241, of angular configuration, extends through a slot 247 into the interior of the chamber 240, and this feeler 241 is pivotally connected to a lever 243 which is supported for turning movement about a stationary pivot pin 242 and which is pivotally connected to an elongated link 244 which carries at its end distant from the lever 243 a pin 245. A spring 246 is operatively connected to the lever 243 and seeks to turn the latter in a clockwise direction, as viewed in FIG. 12, until the feeler 241 engages the rear end 247a of the slot 247.

With the embodiment of the invention which is illustrated in FIG. 12, a blocking means is provided to block a film transporting means against operation when a proper exposure cannot be made, so that the structure of FIG. 12 warns the operator by indicating to him that the camera is not ready for proper operation through the expedient of blocking the operation of an element which must be moved by the operator in connection with the making of an exposure. This blocking means of the embodiment of FIG. 12 takes the form of a pair of blocking levers 248 and 249 which are supported for turning movement by a common pivot pin 250. The lever 248 is provided with a blocking projection 251 while the lever 249 is provided with a blocking projection 252, these blocking projections being in the form of teeth which are adapted to enter between teeth of a gear 253 which forms part of the structure for transporting film in the camera. A spring 254 is compressed between the blocking levers 248 and 249 and seeks to spread them apart from each other at the left side of the pivot 250, as viewed in FIG. 12. In order to limit the turning movement of the blocking levers 248 and 249 a pair of stationary stop pins 255 and 256 are respectively located in the paths of turning movement of these levers as they tend to move apart from each other under the action of the spring 254.

The camera housing of FIG. 12 is also formed with a chamber 257 for receiving a take-up cartridge, and a feeler 260 communicates with the interior of the chamber 257 and is situated in the path of movement of a take-up cartridge into the chamber 257. The feeler 260 is carried by a lever 259 which is supported for turning movement by a pivot pin 258 and which is operatively connected with a spring 261 which to seeks to turn the lever 259 in a clockwise direction, as viewed in FIG. 12. This spring 261 tends to turn the lever 259 to a position where the feeler 260 extends fully into the chamber 257. At its free end, which is distant from the pivot 258, the lever 259 carries a projection 262 which, when the chamber 257 is empty, engages the end of the lever 248 where the tooth 251 is located and turns this lever 248 to position the tooth 251 in engagement with the gear 253 so as to block rotary movement thereof, and of course the spring 261 is stronger than the spring 254.

The gear 253 of the film-transporting means is coaxially fixed with a pulley 263, and these coaxially interconnected elements 253 and 263 are supported for rotary movement by a common shaft 264. A cable 265 extends around the pulley 263 as well as around a further pulley 266 which is coaxially fixed with the film-transporting roll 267. As is well known this film-transporting roll 267 is formed with the projections which enter into the perforations of the film strip. The blocking gear 253 meshes with a further gear 268 which is fixed to a film-transporting lever 269, adapted to be actuated by the operator for transporting the film and the gear 268 and the lever 269 are connected together for turning about a common axis defined by the shaft 270 which supports the gear 268 and the lever 269 for rotary movement as a unit. Of course, in a well known manner, the lever 269 can be actuated only to advance the film by one film frame and thereafter the lever 269 returns to its initial position, and inasmuch as this structure in conventional it is not shown in greater detail in FIG. 12.

Assuming, as shown in FIG. 12, that there are no cartridges in the chambers 240 and 257, then the spring 246 will maintain the feeler 241 in engagement with the end 247a of the slot 247. In this position of the feeler 241, the lever 243 has moved the link 244 forwardly by a distance sufficient to cause the pin 245 to turn the lever 248 away from the stop 255, in opposition to the spring 254 which is weaker than the spring 246, so as to maintain the tooth 251 in engagement with the gear 253, and thus film cannot be transported when there is no cartridge in the chamber 240. In this position, where the tooth 251 extends between a pair of teeth of the gear 253, the transportation of film is blocked and if the operator attempts to turn the lever 269 he will find that he cannot turn this lever.

Assuming now that the operator introduces a supply cartridge into the chamber 240 and that this supply cartridge carries a projection, which is indicative of a film speed which can be handled by the camera, then this projection of the cartridge will engage the feeler 241 and displace it forwardly in the direction of the arrow $m$. In this way the lever 243 is turned, in opposition to the spring 246, in the direction of the arrow $n$. As a result the link 244 is shifted rearwardly and the pin 245 moves in the direction of the arrow $o$. This movement of the pin 245 releases the lever 248 to the force of the compressed spring 254 which thus seeks to displace the lever 248 toward the stop 255. Such movement of the lever 248 at this time is prevented, however, because the spring 261, which is stronger than the spring 254, as pointed out above, still maintains the lever 259 in a position shown in FIG. 12 where the projection 262 of the lever 259 maintains the lever 248 in its locking position. Only when a take-up cartridge is introduced into the chamber 257 is the lever 259 displaced in opposition to the spring 261 in a direction releasing the lever 248 for movement by the spring 254 away from the gear 253 and into engagement with the stop 255. Thus, when both cartridges are introduced into the cartridge chambers the manually operable film-transporting lever 269 is released and can be turned in order to transport the film.

Assuming now that the supply cartridge introduced into the chamber 240 carries a projection whose position on the supply cartridge is indicative of a film speed beyond the range of film speeds which can be handled by the particular camera shown in FIG. 12, then, if this projection is beyond one end of the acceptable range of film speeds, the feeler 241 will simply remain in the position shown in FIG. 12 and the operator will know that something is wrong because the operator will not be able to transport the film since the lever 269 cannot be turned. On the other hand, if the position of the projection on the supply cartridge is such that it indicates a film speed beyond the other end of the acceptable range, then the feeler 241 will be shifted in the direction of the arrow $m$ through such a great distance that the pin 245 will engage the lever 249 and will turn the latter in a clockwise direction, as viewed in FIG. 12, in opposition to the spring 254 away from the stop 256 and into engagement with the gear 253, so that at this time also the film-transporting means will be blocked against operation.

Therefore, it will be seen that with the embodiment of FIG. 12 the structure of the invention operates directly on the film-transporting means not only to indicate to the operator whether or not one or both cartridges are lacking but also to prevent operation if the film speed is beyond the acceptable range of film speeds for which the camera is designed.

Figure 13:
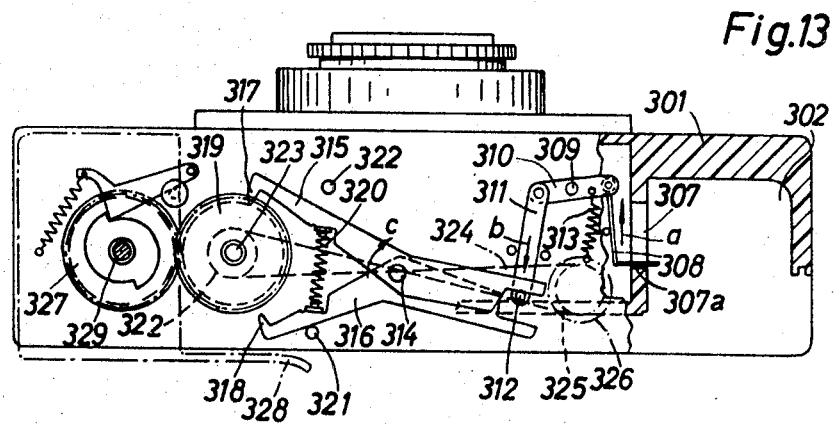
FIG. 13 shows also a structure for blocking operation of the film transporting means if there is no supply cartridge in the chamber of the camera housing which is adapted to receive the supply cartridge.
Figure 14:
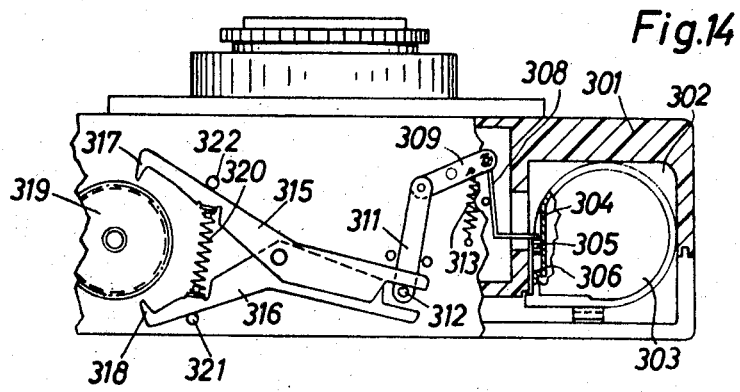
FIG. 14 shows the position in which the structure of FIG. 13 takes when there is a supply cartridge in the camera housing.

The embodiment of the invention which is illustrated in FIG. 13 is quite similar to that of FIG. 12 and shows only how the structure of the invention cooperates with a film supply cartridge. In this embodiment the camera housing 301 is formed with the chamber 302 which is adapted to receive the supply cartridge 303, as indicated in FIG. 14. This cartridge 303 has a flat portion 304 which carries at the exterior of the cartridge the projection 305 whose position on the cartridge is indicative of the speed of the film therein. Thus, the distance between the projection 305 and the end 306 of the flat portion 304 of the cartridge 303 corresponds to the speed of the film in the cartridge 303.

The housing 301 is formed with the slot 307 through which the feeler 308 extends into the chamber 302, this feeler 308 being pivotally connected to one end of a lever 310 which is supported for rotary movement by a stationary pin 309. The other end of the lever 310 is pivotally connected with a link 311 which carries a pin 312. A spring 313 is connected to the lever 310 so as to tend to turn the latter in a clockwise direction, as viewed in FIG. 13, and thus the spring 313 seeks to maintain the feeler 308 in engagement with the rear end 307a of the slot 307.

The pin 312 is situated between the pair of blocking levers 315 and 316 which are supported for rotary movement by a common pin 314. The levers 315 and 316 are respectively provided with the blocking teeth 317 and 318 capable of extending into gaps between the teeth of the blocking gear 319. The spring 320 is compressed between the levers 315 and 316 and seeks to spread them apart from each other. The maximum spreading of the blocking levers from each other by the spring 320 is determined by the stop pins 321 and 322, the pin 321 engaging the lever 316, as shown in FIG. 13, while the pin 322 will be engaged by the lever 315 when the latter is displaced away from the gear 319.

This gear 319 is coaxially fixed with a pulley 322a and supported therewith for rotary movement about the common shaft 323. The pulley 322a is connected by a cable 324 with a further pulley 325 which is fixed with the schematically indicated, toothed film transporting roll 326.

The gear 319 meshes with a further gear 327 which, together with the manually operable film-transporting levers 328 is mounted on a further shaft 329 for rotary movement.

FIG. 13 shows the camera when there is no cartridge in the chamber 302. If this chamber 302 receives a cartridge 303 which carries a projection 305 whose position is indicative of a film speed within the range of film speeds which can be handled by the camera, then the projection 305 will displace the feeler 308 to a position such as that shown in FIG. 14, and as a result the lever 310 is turned in opposition to the spring 313 so as to displace the link 311 forwardly and thus release the locking lever 315 to the spring 320 which displaces the lever 315 into engagement with the pin 322, as shown in FIG. 14, and thus the gear 319 of the film-transporting means is released. Of course, at this time the blocking lever 316 is still maintained by the spring 320 in engagement with the stop 321.

On the other hand, if the cartridge 303 has a projection 305 whose position on the cartridge indicates a film speed beyond the range which can be handled by the camera, then, if this film speed is beyond one end of the range the feeler 308 will simply remain in the position shown in FIG. 13 and the gear 319 will remain blocked by the lever 315, while if the position of the projection 305 indicates a film speed beyond the other end of the acceptable range of film speeds, then the feeler 308 will be shifted sufficiently to displace the pin 312 into engagement with the lever 316 to turn the latter in opposition to the spring 320 to a position where the tooth 318 extends between a pair of teeth of the gear 319 to prevent rotary movement of the latter, and in this case also the camera will be blocked against operation.

Therefore, it is apparent from FIGS. 13 and 14 that the invention is also applicable, in a somewhat simpler manner, to devices which cooperate only with the film supply cartridge and the chamber for receiving the same, so that with the invention it is not essential in all cases to provide a structure which cooperates both with the supply and the take-up cartridge, although this latter construction, as shown in FIGS. 1–12, is preferable because of the greater security it provides against improper operation.

FIG. 15 shows also an embodiment of the invention adapted to cooperate only with the supply cartridge. In the embodiment of FIG. 15 the camera housing 401 is adapted to receive the supply cartridge 402 in the cartridge chamber 403. This cartridge 402 is provided at its flat portion 404 with the projection 405 whose position with respect to the end 406 of the flat portion 405 is such as to be indicative of the speed of the film in the cartridge 402.

The cartridge chamber 403 receives in its interior, through a slot which is formed in the housing 401, the free end of a feeler 407 which is pivotally connected to one end of a lever 409 which is supported for turning movement by a stationary pivot pin 408. The other end of the lever 409 is pivotally connected with a link 410 which carries a pin 411 extending into an elongated slot 412 which is formed in the elongated blocking lever 413 which is supported for rotary movement by a stationary pivot 414 and which carries the light-blocking elements 415 and 416. A spring 417 is operatively connected to the lever 413 and seeks to maintain the lever 413 in engagement with a stop pin 418. The turning of the lever 413 in the direction of the arrow $a$ of FIG. 15 is limited by a second stop pin 419.

In the position of the parts shown in FIG. 15, and this is the rest position, the spring 417 maintains the lever 413 in engagement with the stop pin 418. In this position the light-blocking element 415 of the blocking lever 413 is aligned with a gap between the elements 425 through which light passes along a predetermined path to the portion 421 of a pointer 422 of a moving coil instrument 423, the light being deflected along this path from the front of the camera by the reflector 420. Thus, the light-blocking element 415, when it is in the blocking position shown in FIG. 15, prevents light from reaching the portion 421 of the pointer 422, and thus the semitransparent reflector 424 of the viewfinder of the camera will not receive an image of the pointer portion, so that when the operator views along the optical axis A–B of the viewfinder he will not see the pointer image and therefore will know that a proper exposure cannot be made. The portion 421 of the pointer 422 is preferably colored, red, for example, and is made of a transparent material, so that where a proper exposure can be made this portion of the pointer is visible while when a proper exposure cannot be made this portion of the pointer will be situated at a location displaced from the gap between the opaque elements 425 so that in this case the operator will not see an image of the pointer portion 421 and will therefore know that the lighting conditions are such that the moving coil instrument is in the position indicating that a proper exposure cannot be made. Thus, the light-blocking element 415, when it is in the illustrated light-blocking position, prevents also an image of the pointer portion from being provided for the operator, so that if the light-blocking element 415 is opaque the operator will see a dark area and will know that a proper exposure cannot be made while in the event that the light-blocking element 415 is transparent and of a suitable color, the color thereof, which of course will contrast with the color of the pointer portion 421, will be visible in the viewfinder and will indicate to the operator that, for example, a supply cartridge 402 is not present in the chamber 403.

Assuming now that the supply cartridge 402 is advanced forwardly, in the direction of the arrow $b$ of FIG. 15, into the chamber 403, then the projection 405 will engage the feeler 407 and will displace it forwardly. As a result the lever 409 turns in a counterclockwise direction, as viewed in FIG. 15, and shifts the link 410 rearwardly so that the pin 411 acting through the slot 412 on the lever 413 turns the latter in the direction of the arrow $a$ of FIG. 15. Assuming that the position of the projection 405 is such that it is indicative of a film speed which can properly be handled by the camera, then the lever 413 will be turned to an angle which will displace both of the light-blocking elements 415 and 416 to positions where they do not interfere with the path of light passing between elements 425 so that if the lighting conditions are suitable for exposure the operator will indeed see in the viewfinder an image of the pointer portion 421. Of course, even under these conditions if the lighting conditions are such that a proper exposure cannot be made then the operator, instead of seeing the pointer portion 441, will simply see an image of the structure 425.

On the other hand, if the position of the projection 405 of the cartridge 402 is indicative of a film speed which is beyond the range of film speeds which can be handled by the particular camera, then the feeler 407 is, in the event that the film speed is beyond one end of the acceptable range of film speeds, be shifted forwardly through such a distance that the lever 413 will be turned through an angle sufficiently great to locate the light-blocking element 416 in the path of light which provides an image of the pointer portion 421. On the other hand, if the position of the projection 405 is such that the film speed is beyond the other end of the range of acceptable film speeds, then either the feeler 407 will not be moved or it will be moved through such an extremely short distance that the light-blocking element 415 will remain in this position extending across the path of light which is required for providing an image of the pointer portion 421.

Therefore, with the embodiment of FIG. 15 a relatively simple structure cooperates with the light meter and viewfinder to provide an indication either that the supply cartridge is missing or that the film speed is beyond the acceptable range of film speeds.

The embodiment of the invention which is illustrated in FIG. 16 again illustrates how the invention is applicable only to a supply cartridge, but in this case the principles of the invention are applied to the scanning structure of a camera. Thus, as may be seen from FIG. 16 the structure includes a moving coil instrument 430 which includes a pointer 431 which is freely movable over a stationary anvil 432 which is formed with a slot 433. The scanning structure also comprises a scanning plate 434. The scanning plate 434 can move through the slot 433 and is provided with a scanning edge 435 which is directed toward the pointer 431. The scanning plate 434 is provided on both sides of the scanning edge 435 with portions 436 and 437 beneath which the pointer 431 becomes located under extreme lighting conditions, namely conditions of too much or too little light, respectively, when a proper exposure cannot be made, so that as a result of this location of the pointer 431 the scanning plate 434 will not be able to move downwardly through the slot 433. The scanning plate 434 carries an elongated motion-transmitting portion 438 connected, as by a pin-and-slot connection, to a rotary ring 439 which upon turning will set the exposure time and/or the aperture, and a spring 440 is operatively connected to the scanning plate 434 to urge the latter downwardly from the illustrated rest position to its scanning position. In order to maintain the scanning plate 434 in its rest position illustrated in FIG. 16 a spring 442 acts on a shutter release plunger 441 to raise the latter to the illustrated rest position, and this spring 442 is stronger than the spring 440. A pin 443 fixed to the plunger 441 extends beneath a pin 444 which is fixed to the scanning plate 434, so that through the cooperation of these pins the spring 442 maintains the scanning plate 434 in its illustrated rest position.

The elongated motion transmitting portion 438 of the scanning plate 434 has a camming edge portion 445 acting on an arm 446 of a lever 447 which is supported for pivotal movement and urged by a spring 448 in a clockwise direction, as viewed in FIG. 16. This lever 447 carries a pair of differently colored transparent indicator portions 449 and 450, and either one or the other of these indicator portions is rendered visible when the operator views along the axis C–D. When the operator sees the color of the indicator 450, the operator knows that a proper exposure can be made, while when the operator sees the color of the indicator 449, the operator knows that a proper exposure cannot be made and therefore the operator is warned against making an exposure. Of course, the operator will notice that the color of the indicator 449 remains after the operator starts to depress the shutter release plunger 441, and if the color does not change then of course the operator will not continue to depress the plunger 441 so that an improper exposure will not be made.

The anvil 432 carries a pivot pin 451 on which a blocking lever 452 is turnable. This blocking lever 452 is integrally connected with a feeler 453 which extends into the unillustrated cartridge chamber which receives a supply cartridge 455. A spring 454 is operatively connected to the lever 452 to urge the latter to turn in the direction of the arrow $d$ in FIG. 16, and thus seeks to move the feeler 453 in a direction opposite to that indicated by the arrow $e$ in FIG. 16 in which the cartridge 455 is moved when introduced into the cartridge chamber. When there is no cartridge in the chamber the spring 454 will maintain the lever 452 in engagement with a stationary stop 456. The feeler 453 is at the elevation of a projection 457 of the cartridge 455, this projection 457, by its position on the cartridge 455, indicating the speed of the film in the cartridge.

In the event that there is no supply cartridge 455 in the camera housing, then of course the spring 454 will maintain the blocking lever 452 in engagement with the stop 456, and in this position of the blocking lever 452 its arm 459a will extend beneath the portion 436 of the scanning plate 434 to block downward movement of the latter, and thus operation of the camera is not possible when there is no cartridge in the chamber which receives the supply cartridge. Thus, with the blocking arm 459a beneath the portion 436 of the scanning plate 434, if the operator should depress the shutter release plunger 441 in a direction opposite to that indicated by the arrow $c$ in FIG. 16, then the scanning plate 434 will not be able to follow the movement of the shutter release plunger. Therefore, the camera adjusting structure 439 and the indicator carrying lever 447 will not be able to turn, and thus the operator will know that a proper exposure cannot be made. The scanning plate 434 also can in a known way, which is not illustrated, be connected with a structure for blocking actuation of the shutter. The operator of the camera, therefore, when viewing along the light path C–D shown in FIG. 16 will notice that the indicator 449 remains visible and therefore will be warned against making an exposure, or in the case where the shutter is blocked against being tripped to make an exposure the operator will notice that he cannot trip the shutter and in this way will be warned that something is wrong and that a proper exposure cannot be made.

In the event that there is introduced into the camera housing a supply cartridge 455 having a projection 457 which is indicative of a film speed which can properly be handled by the camera, then the feeler 453 will be turned, together with the blocking lever 452, in a direction opposite to that indicated by the arrow $d$ in FIG. 16, so that the blocking arm 459a is situated beyond the path of downward movement of the portion 436 of the scanning plate 434, so that now the ring 439 can be adjusted and the lever 447 can be turned, by cooperation of the camming edge 445 with the arm 446 of this lever, so as to displace the indicator 450 into the line of vision C–D.

If the supply cartridge 455 has a projection 457 indicative of a film speed which cannot be properly handled by the camera, the blocking lever 452 is rotated in a direction counter to that indicated by the arrow $d$ to move its second arm 459b into the path of the portion 436 of the scanning plate 434. Consequently, when the operator presses upon the release plunger 441, the angular position of the ring 439 and arm 446 remains unchanged.

Of course, instead of the particular scanning arrangement which is illustrated in FIG. 16, it is possible to use with the invention other known scanning structures.

In the embodiment of the invention which is illustrated in FIG. 17 there is a camera housing 460 of a still camera, and this camera housing 460 is formed with a chamber 461 for receiving a supply cartridge 462 of the same type as the other supply cartridge referred to above, namely the type in which the film is coiled without being mounted on a rotary film spool. A feeler lever 463 extends through a slot of the housing 460 into the chamber 461, this lever 463 being supported for rotary movement by a stationary pin 464 and having a second arm 465 which extends substantially perpendicularly from the arm that extends into the chamber 461. The arm 465 of the lever 463 extends forwardly from the pivot 464, and a spring 466 is operatively connected to the horizontal arm of the lever 463 to urge the lever in the direction of the arrow $g$ in FIG. 17. The arm 465 is connected by a pin-and-slot connection 467, 468 with a shiftable covering means 469. This covering means 469 is opaque and is situated between a honeycomb lens 470, at the front of the camera housing, and a photosensitive element 471 of the light-measuring means of the camera. As is shown particularly in FIG. 18, the shiftable cover means 469 is in the form of a plate formed with a row of parallel elongated slots 472 so that the plate 469 has substantially a grid-shaped configuration. Elongated opaque plate portions 473 remain between the slots 472 and have a width which is substantially equal to that of the slots 472. The honeycomb lens 470 is provided at its rear surface which is directed toward the shiftable cover 469 with opaque ribs 474 the width of which corresponds to the width of the slots 472 and the elongated plate portions 473 therebetween. Instead of a honeycomb lens which is provided with the opaque ribs 474, it is possible to mount at the rear surface of a honeycomb lens an opaque plate which is formed with elongated cutouts or slots corresponding to the spaces at the rear of the honeycomb lens between the ribs 474 thereof.

The photosensitive element 471 is electrically connected in a known way into the measuring circuit 475 which includes a moving coil instrument 476.

With the embodiment shown in FIG. 17, the cartridge 462 has the projection 477 which, by its position on the cartridge, is indicative of the film speed and which engages the feeler arm of the lever 463, so that in accordance with the position of the projection 477 the arm 465 has been turned in a direction opposite to that indicated by the arrow g of FIG. 17 to such a position that the plate portions 473 substantially register with the ribs 474 and thus light has free access through the honeycomb lens 470 to the photosensitive element 471. In accordance with the particular position of the projection 477 of the cartridge 462, the extent to which the ribs 474 and plate portions 473 overlap each other will be determined by the film speed which is indicated by the position of the projection 477, so that the cross sectional area of the passage through which light can reach the photosensitive element 471 is controlled by the position of the projection 477, and in this way the structure of FIG. 17 will directly adjust the light-measuring means in accordance with the film speed. In the event that the position of the projection 477 is such that it indicates a film speed beyond the range of film speeds which can be properly handled by the camera, the arm 465 is turned to such a position that either the spaces between the ribs 474 of the lens 470 are again covered by the opaque plate portions 473 or the lever 463 is turned to such a small extent from its initial rest positions engaging the rear end of the feeler slot through which the arm extends that in this case also the light passages between the ribs 474 remain blocked and no light can reach the photosensitive element 471, so that in either case the moving coil instrument 476 remains in a position indicating that a proper exposure cannot be made, and of course the same is true when there is no cartridge 462 in the chamber 461. Thus, when there is no cartridge in the chamber 461 or when the projection 477 indicates a film speed beyond one end of the range of acceptable film speeds, the structure will remain in its rest position where the slots 472 are precisely aligned with the ribs 474, or if the projection 477 indicates a film speed beyond the other end of the acceptable range of film speeds the plate 469 is shifted by a distance equal to double the width of a slot 472, so that in this case also the slots 472 are aligned with the ribs 474.

In all of these cases the pointer of the moving coil instrument 476 remains in its initial end position indicating to the operator that a proper exposure cannot be made.

Of course, it is possible to provide a construction where the shiftable cover means 469 can only be moved between two distinct positions in which either the photosensitive element 471 is completely covered or in which the greatest possible cross sectional area for the light passages is provided, but in this case it would not be possible to use the structure also for the purpose of making the adjustment for the film speed, so that the particular construction shown in FIGS. 17 and 18 is preferred.

According to the embodiment of the invention which is illustrated in FIG. 19, the camera housing 480 is also formed with a chamber 481 for receiving a supply cartridge 482 in which film is coiled without being supported on a rotary spool. A feeler 483 extends into the chamber 481 through a slot formed in the housing 480. This feeler 483 is supported for swinging movement by a pivot pin 484. The feeler 483 is in the form of a lever which is at least partly electrically conductive, and this feeler 483 forms a movable electrical contact which is movable between stationary contacts 485 and 486. The stationary contacts 485 and 486 as well as the movable contact formed by the feeler 483 are connected into an electrical circuit 487 which is connected in parallel with a circuit 488 to which the moving coil instrument 489 is electrically connected. The circuit branch 488 includes a photosensitive element 490 and a resistor 491. By closing the switch 483, 485 or the switch 483, 486, the moving coil instrument 489 will be short circuited, so that the pointer of the moving coil instrument 489 will return to its starting position and thus indicate to the operator that a proper exposure cannot be made. A spring 492 is operatively connected to the feeler lever 483 and seeks to displace the latter to a position where it engages the contact 486.

The structure is shown in FIG. 19 with the cartridge 482 situated within the chamber 481 and with the projection 493 of the cartridge 482 engaging the feeler lever 483 so as to hold the latter, in opposition to the spring 492, in a position spaced between the contacts 485 and 486. In this position the circuit portion 487 is open so that the position of the pointer of the moving coil instrument 489 is determined by the intensity of the light which impinges on the photosensitive element 490. As soon as a cartridge 482 is removed from the camera, however, the feeler lever 483 is displaced by the spring 492 back to its starting position where it engages the contact 486, and thus the instrument 489 is short circuited. With this construction also if the supply cartridge 482 has a projection 493 whose position indicates a film speed beyond the range of acceptable film speeds, then this projection 493 can displace the lever 483 through such a distance that it will engage the contact 485 so as to also short circuit the instrument 489. Therefore, with the embodiment of FIG. 19 if there is no cartridge in the chamber 481 or if the projection 493 indicates a film speed beyond one end of the acceptable range of film speeds, the lever 483 will simply remain in engagement with the contact 486 and the instrument 489 will be short circuited. If, however, the film speed indicated by the projection 493 is beyond the other end of the acceptable range of film speeds, then the lever 483 will be displaced into engagement with the contact 485 and the instrument 489 will also be short circuited. With this embodiment also the projection 493 can be used for automatically actuating a structure which automatically introduces the factor of film speed into the camera.

The embodiment of the invention which is illustrated in FIG. 20 differs from that of FIG. 19 primarily in that in FIG. 20 the light-measuring circuit 500 is provided with a moving coil instrument 501 and a photosensitive element 502, as well as with a stationary contact 503 engaged by a movable contact 504 which can move along the stationary contact 503 in order to complete the circuit and which opens the circuit when situated beyond the stationary contact 503. The movable contact 504 is connected with a lever arm 505 which is electrically conductive and which forms a feeler lever, this lever 505 being supported for turning movement by a stationary pin 506, and a spring 507 acts on the lever 505 to urge the latter to turn in a clockwise direction, as viewed in FIG. 20, to the rear end of a slot in a camera housing 511 through which the feeler lever 505 extends into a chamber 510 of the camera housing which receive the supply cartridge 508 which is provided with the projection 509 which is indicative of the film speed in the cartridge 508 and which engages the feeler lever 505 as indicated in FIG. 20. Thus, if there is a cartridge 508 in the chamber 510 of the housing 511, as shown in FIG. 20, and if the projection 509 has on the cartridge 508 a position which is indicative of a film speed which is in the acceptable range of film speeds of the camera, then the projection 509 will place the lever 505 in a position where the springy movable contact 504 engages the stationary contact 503 so as to close the circuit 500.

On the other hand, if the cartridge 508 is removed from the chamber 510, then the spring 507 displaces the lever 505 to its rear position engaging the rear end of the slot of the housing through which the lever 505 extends into the chamber 510, and in this position the movable contact 504 moves beyond the stationary contact 503 and thus opens the circuit. In the event that there is no cartridge in the chamber 510, therefore, or in the event that the projection 509 has a position indicating a film speed beyond one end of the range of acceptable film speeds, the lever 505 will simply remain in its initial position and the circuit 500 will remain open so that the moving coil instrument 501 will indicate to the operator that a proper exposure cannot be made. On the other hand, if the position of the projection 509 is indicative of a film speed beyond the other end of the range of acceptable film speeds, then the lever 505 will be turned through such a distance, in the direction of the arrow h of FIG. 20, that the movable contact 504 will move all the way along the entire length of the stationary contact 503 and then beyond the latter so as to open the circuit in this case also and thus the pointer of the moving coil instrument 501 will indicate to the operator that a proper exposure cannot be made.

Of course, many variations are possible with the above-described structures of the invention. For example, where light-blocking elements are used to prevent the formation of an image of a portion of a moving coil instrument pointer in the viewfinder, it is possible instead to, use such light blocking elements to cover a window in the camera through which the pointer is visible, so that when a proper exposure cannot be made the window will be covered by one or the other of the light-blocking elements and is this way the operator will know that a proper exposure cannot be made. Moreover, in those embodiments of the invention where a moving coil instrument is used to indicate by the position of its pointer that a proper exposure cannot be made, this moving coil instrument can also be used in a manner well known in the art for the purpose of automatically setting the exposure time and/or the aperture of the camera, and of course in this case a scanning structure can cooperate with the pointer, as described above, or the moving coil instrument itself can be used for directly determining the position of the blades of a diaphragm, for example.

It will be understood that each of the elements described above, or two or more together, may also find a useful application in other types of cameras differing from the types described above.

While the invention has been illustrated and described as embodied in cameras with cartridges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a camera, in combination, a camera housing formed with a pair of cartridge chambers for respectively receiving a supply cartridge and a take-up cartridge; operating means carried by said camera housing to be operated in connection with exposing film therein; and means for preventing actuation of said operating means, said means for preventing actuation of said operating means extending into said chambers and being acted upon by cartridges therein to be placed thereby in a position for permitting actuation of said operating means.

2. In a camera, in combination, a camera housing formed with a pair of cartridge chambers for respectively receiving supply and take-up cartridges; and indicating means carried by said camera housing for indicating when the camera is ready for operation, said indicating means extending into said chambers to be actuated by cartridges therein, respectively, and said indicating means including feeler levers respectively extending into said chambers and respectively acted upon by springs to be urged to a rest position where said levers are situated in the path of movement of cartridges into said chambers to be displaced by cartridges which are introduced into said chambers.

3. In a camera, in combination, a camera housing formed with a cartridge chamber for receiving a supply cartridge which carries a projection whose position is indicative of the speed of the film in the cartridge; light measuring means carried by said housing for measuring the light intensity and adapted to be adjusted in accordance with the speed of the film in the cartridge; and indicating means carried by said housing and extending into said chamber to be engaged by said projection of said cartridge for indicating when the camera is ready for operation.

4. In a camera, in combination, a camera housing formed with a cartridge chamber for receiving a supply cartridge which carries a projection whose position is indicative of the speed of the film in the cartridge; light measuring means carried by said housing for measuring the light intensity and adapted to be adjusted in accordance with the speed of the film in the cartridge; and indicating means carried by said housing and extending into said chamber to be engaged by said projection of said cartridge for indicating when the camera is ready for operation, said indicating means assuming, when there is no cartridge in said chamber, a position indicating that the camera is not ready for operation, and when said projection is in a position indicating a film speed which cannot be properly exposed in the camera placing said indicating means also in said position indicating that the camera is not ready for operation.

5. In a camera, in combination, a camera housing formed with a chamber for receiving a supply cartridge carrying a projection whose position is indicative of the speed of the film in the cartridge; light-measuring means carried by said camera housing for measuring light intensity and being adjustable within a predetermined range of film speeds, said light-measuring means including blocking means operatively connected to said camera for blocking operation thereof, said blocking means extending into said chamber and being actuated by said projection of a cartridge to be placed thereby in a position blocking operation of the camera when the position of said projection is indicative of a film speed beyond said range.

6. In a camera, in a combination, a camera housing formed with a cartridge chamber for receiving a cartridge carrying coding means whose position is indicative of the speed of the film in such cartridge; light measuring means for measuring light intensity and being adjustable by the coding means of a cartridge in said chamber to be set for that one of a range of film speeds which corresponds to the speed of film in the cartridge in said chamber; viewfinder means carried by said camera housing; and indicating means extending into said housing for indicating in said viewfinder means when the camera is ready for operation, said indicating means being actuated by said coding means of a cartridge for indicating that the camera is not ready for operation both when there is no cartridge in said chamber and when said coding means has a position which is indicative of a film speed located beyond said range.

7. In a camera, in combination, a camera housing formed with a pair of cartridge chambers for respectively receiving supply and take-up cartridges; a pair of indicating levers extending into said chambers to be displaced by cartridges inserted therein for indicating when the camera is ready for operation; viewfinder means; a flag displaceable to and from a position visible in the field of view of the viewfinder means; and a totalizing transmission operatively connected to said indicating levers to be actuated thereby and operatively connected to said flag for displacing the latter to and from a position visible in the field of view of the viewfinder, said totalizing transmission when actuated by both of said levers displacing said flag to one of its positions and when acted upon by only one of said levers or by neither one of said levers locating said flag in the other of its positions, so that the location of said flag in said one position is an indication to the operator that both chambers have cartridges therein and that the camera is ready for operation.

8. In a camera, in combination, a camera housing formed with a cartridge chamber which is adapted to receive a cartridge; lever means extending into said chamber to be displaced by a cartridge inserted into said chamber, said lever means carrying a pin situated beyond said chamber; an elongated indicating lever supported for turning movement in said camera housing and formed with a slot receiving said pin, said indicating lever carrying a flag; and a viewfinder carried by said housing and in which said flag is visible when said lever is in one position, said indicating lever when in a second position situating said flag beyond the field of view of the viewfinder, and a cartridge when inserted into said chamber displacing said indicating lever through said pin-and-slot connection with said feeler lever to situate said flag in one of said positions thereof for indicating to the operator the presence of a cartridge in said chamber.

9. In a camera, in combination, a camera housing formed with a pair of chambers for respectively receiving supply and take-up cartridges; a pair of indicating levers turnably carried by said camera housing and extending into said chambers, respectively, said levers being displaced by cartridges inserted into said chambers, respectively; viewfinder means; and a pair of flags respectively carried by said levers and respectively visible in said viewfinder means when there are no cartridges in said chambers, said cartridges when inserted into said chambers displacing said levers to positions which locate said flags beyond the field of view of said viewfinder means, so that when the operator sees one or both of said flags in said view-finder means the operator knows that one or both of said cartridges are lacking.

10. In a camera, in combination, light measuring means including a moving coil instrument having a pointer; viewfinder means in which a portion of said pointer is visible; a camera housing carrying said light measuring means and viewfinder means and formed with a pair of chambers for respectively receiving supply and takeup cartridges; and means extending into said chambers to be actuated by cartridges inserted into the same and cooperating with said portion of said pointer for rendering said pointer portion visible in said viewfinder only when cartridges are respectively located in said chambers.

11. In a camera, in combination, a camera housing formed with a pair of chambers for respectively receiving supply and take-up cartridges; an elongated lever supported by said housing for pivotal movement intermediate the ends of said lever, said lever having one end extending into the chamber which receives the take-up cartridge to be displaced by a cartridge inserted into the latter chamber; a second lever pivotally supported intermediate its ends on the other end of said first-mentioned lever, a feeler carried by one end of said second lever and extending into the other of said chambers which receives the supply cartridge to be displaced by a supply cartridge introduced into said other chamber, said feeler being displaced with respect to said other chamber when a take-up cartridge is introduced into said one chamber to turn said first-mentioned lever while said feeler then displaces said second lever on said first-mentioned lever when a supply cartridge is introduced into said other chamber, an indicating lever carrying a blocking flag operatively connected to said second lever to be turned when said second lever turns; a light meter having a pointer carrying a visible portion, said flag of said indicating lever being displaced during turning of said indicating lever between positions blocking or unblocking the visibility of said portion of said pointer; and a viewfinder in which said portion of said pointer is visible, whereby said levers form a totalizing transmission responding to insertion of cartridges into said chambers for rendering said pointer portion visible or invisible in the viewfinder depending upon whether or not cartridges are situated in said chambers.

12. In a camera as recited in claim 15, said supply cartridge carrying a projection whose position on the cartridge is indicative of the speed of the film in the cartridge and said feeler being displaced to end positions when the position of said projection of said cartridge is indicative of a film speed beyond the range of film speeds which can be handled by the camera, said indicating lever carrying a pair of flags one of which blocks the viewing of said portion f said pointer of said light meter when said feeler is in one of its extreme positions and the other of which blocks the viewing of the pointer portion when the feeler is in the other of its extreme positions, one of said extreme positions of said feeler being the same as the position it takes when there is no cartridge in said chamber which receives the supply cartridge.

13. In a camera, in combination, a camera housing formed with a pair of cartridge chambers for respectively receiving supply and take-up cartridges; a pair of feeler levers respectively extending into said chambers to be displaced by cartridges introduced into the same; electrical indicating means for indicating the presence or absence of cartridges in said chambers; and an electrical circuit in which said electrical indicating means is located, said circuit being operatively connected to said levers to be placed by the latter in a condition for providing through said electrical indicating means an indication of the presence or absence of cartridges in said chambers.

14. In a camera as recited in claim 13, said circuit including a pair of switches which are respectively closed by said levers when there are no cartridges in said chambers and which are opened by said levers when cartridges are introduced into said chambers, and said circuit including a source of current and a switch which is closed upon actuation of a shutter-release means of the camera in order to release the shutter to make an exposure, whereby when there are no cartridges in said chambers said electrical means will be energized while if there are cartridges in said chambers said electrical indicating means will not be energized.

15. In a camera as recited in claim 14, said switches being located in a pair of independent circuit portions and said circuit portions operating independently of each other for providing an indication through said electrical indicating means upon closing of the switch which is operated by said shutter release means.

16. In a camera as recited in claim 15, the switch which is actuated by the lever which extends into the chamber which receives the supply cartridge having a pair of spaced stationary contacts and said latter lever carrying contacts which in one extreme position of said latter lever engages one of said spaced contacts and in the other extreme position of said lever engages the other of said spaced contacts.

17. In a camera, in combination, a camera housing formed with a pair of chambers for respectively receiving supply and take-up cartridges; a pair of levers respectively extending into said chambers to be displaced by cartridges introduced into said chambers; an electrical circuit having a pair of parallel circuit portions supplied with current from a common source and both having a common branch which includes a switch capable of being closed upon actuation of the shutter of the camera, said branches respectively carrying electrical indicating means which are energized upon closing of the circuits of said branches, and said branches respectively including switches actuated by said levers to be closed when there are no cartridges in said chambers, whereby each branch indicates through its own indicating means the presence or absence of a cartridge.

18. In a camera as recited in claim 17, said pair of indicating means respectively being in the form of a pair of lamps which are energized upon closing of said branches of said circuit.

19. In a camera, in combination, a camera housing formed with a pair of chambers for respectively receiving supply and take-up cartridges; a pair of levers extending into said chambers to be displaced by cartridges inserted into said chambers; a switch actuated by the lever which extends into the chamber which receives said take-up cartridge to be closed when said take-up cartridge is introduced into the latter chamber; a second switch adapted to be closed by said lever which extends into the chamber which receives said supply cartridge, said second switch including an elongated stationary switch element and a movable switch element sliding along said stationary switch element and carried by said lever for movement along said stationary element, whereby said second switch is closed as long as said latter lever is within a predetermined range of turning movement; and an electrical circuit including said switches, a source of current, and an electrical indicating means which is energized when said circuit is closed to give an indication of the presence of cartridges in said chambers, said circuit including a third switch which must be closed to complete said circuit and said camera including a shutter-actuating means which closes said third switch when the shutter is actuated.

20. In a camera, in combination, a camera housing formed with a pair of chambers for respectively receiving supply and take-up cartridges; a pair of levers extending into said chambers to be displaced by cartridges introduced into said chambers, respectively; an electrical circuit including a photosensitive means which responds to light intensity, a source of current, and a light meter, said circuit including a switch actuated by one of said levers to be opened when there is no cartridge in the chamber which receives said one lever so as to prevent current from flowing through said light meter, whereby the location of the pointer thereof at its initial position is indicative of the lack of a cartridge, said circuit also including a second switch actuated by the other of said levers for short-circuiting said light meter to indicate also the lack of a cartridge.

21. In a camera as recited in claim 20, said second switch including a pair of spaced stationary contacts and a movable contact carried by the lever which short-circuits the light meter and movable between said spaced contacts, said movable contact when engaging either of said spaced contacts short-circuiting said light meter.

22. In a camera, in combination, a camera housing formed with a pair of chambers for respectively receiving supply and take-up cartridges; lever means extending into said chambers to be actuated by cartridges introduced into said chambers, said lever means being displaced by said cartridges and assuming a position which represents the presence of both cartridges in said said chambers, so that said lever means act as a totalizing transmission for totalizing the presence of the cartridges in both chambers; a light meter having a movable pointer; scanning means for scanning the position of said pointer; and blocking means movable to and from a blocking position blocking movement of said scanning means toward said pointer, said blocking means being opeartively connected to said lever means to be placed thereby in a blocking position when said lever means is in a position indicating that both of said cartridges are not in said chambers.

23. In a camera as recited in claim 22, said scanning means having a scanning edge and having a portion in whose path of movement said blocking means is located to prevent movement of said scanning means when said blocking means is in said blocking position thereof, said scanning means when not blocked by said blocking means automatically setting the camera, at least in part, to make an exposure according to the position which is reached by said scanning means when it engages the pointer of the light meter.

24. In a camera as recited in claim 22, said blocking means having a pair of blocking arms either of which is capable of blocking operation of said scanning means, said supply spool carrying a projection which is indicative of film speed, and said lever means cooperating with said blocking means for placing one or the other of said blocking arms thereof in the blocking position when the projection carried by said supply cartridge indicates a film speed situated beyond the range of film speeds which can be handled by the camera, and one or the other of said arms of said blocking means being placed in said blocking position by said lever means irrespective of the presence of a cartridge in the chamber which receives a take-up cartridge, when the film in the supply cartridge is situated beyond the film speed range of the camera.

25. In a camera as recited in claim 24, indicating means actuated by said scanning means for indicating when the latter is blocked against operation.

26. In a camera, in combination, a camera housing formed wtih a pair of chambers adapted to respectively receive supply and take-up cartridges; a moving coil instrument; photosensitive means electrically connected with said moving coil instrument; cover means movable between a position covering said photosensitive means to prevent light from reaching the latter and uncovering said photosensitive means to allow access of light thereto; and lever means extending into said chambers to be displaced by cartridges introduced into said chambers, said lever means when displaced by said cartridges shifting said cover means from its position to prevent the light from reaching said photosensitive means to its position allowing light to have access to said photosensitive means.

27. In a camera as recited in claim 26, said cover means including an opaque plate formed with elongated parallel slots separated from each other by elongated paral'el opaque portions and said camera including a honeycomb lens through which light passes to reach said photosensitive means, said plate being situated between said lens and said photosensitive means and said photosensitive means having spaced parallel opaque portions between which said opaque portions of said plate extend when said cover means is in said covering position thereof and with which said opaque portions are aligned when said cover means is in said non-covering position so that light passing between said opaque portions of said lens will then pass through said slots to have access to said photosensitive means.

28. In a camera, in combination, a camera housing formed with a pair of chambers for respectively receiving supply and take-up cartridges; light meter means carried by said camera housing; photosensitive means operatively connected to said light meter means for actuating the latter in response to the intensity of light which reaches said photosensitive means; cover means shiftable between positions respectively covering and uncovering said photosensitive means; a first lever extending into the chamber which receives said take-up cartridge and operatively connected to said cover means for maintaining the latter in said covering position thereof whenever there is no cartridge in the latter chamber; and yieldable lever means extending into the chamber which receives said supply cartridge to be acted upon by a supply cartridge introduced into the latter chamber for shifting said cover means to said uncovering position thereof, said yieldable lever means yielding when there is no take-up cartridge in the camera to permit said cover means to remain in said covering position thereof until a take-up cartridge is introduced into the camera, so that even if a supply cartridge is placed by itself in the camera the light will not have access to said photosensitive means, the displacement of said cover means from said covering to said uncovering position thereof in response to placing of a take-up cartridge in said camera housing being prevented by said yieldable lever means until a supply cartridge is also placed in said camera housing.

29. In a camera as recited in claim 28, said yieldable lever means having end positions in both of which said cover means is in a position covering said photosensitive means to prevent light from reaching the latter, so that unless said yieldable lever means is placed by a supply cartridge at a position between said end positions thereof light will not be able to reach said photosensitive means.

30. In a camera, in combination, a camera housing formed with a pair of cartridge chambers for respectively receiving supply and take-up cartridges; a pair of feeler levers respectively extending into said chambers to be displaced by cartridges inserted into said chambers, respectively; film transporting means carried by said camera housing; and blocking means carried by said camera housing and movable between a blocking position blocking said film transporting means from operation and an unblocking position releasing said film transporting means for operation, said feeler levers when displaced by said cartridges acting on said blocking means for displacing the latter to said unblocking position thereof, so that film can be transported when there are cartridges in both of said chambers.

31. In a camera as recited in claim 30, said blocking means including a blocking lever having a toothed end engaging a gear of said film transporting means and said blocking lever remaining in a blocking position unless both of said feeler levers are displaced by cartridges respectively introduced into said chambers.

32. In a camera as recited in claim 31, said blocking means including a second blocking lever cooperating with said gear to block the same, and said feeler lever which cooperates with the supply cartridge maintaining said first-mentioned blocking lever in said blocking position when said latter feeler lever is in one extreme position and displacing said second blocking lever to its blocking position when said latter feeler lever is in an opposite extreme position.

33. In a camera as recited in claim 32, first spring means extending between and engaging said pair of blocking levers for maintaining the latter apart from each other, and second spring means actuated by said feeler lever which cooperates with said supply cartridge and being stronger than said first spring means for controlling the movement of said blocking levers.

34. In a camera as recited in claim 33, the supply cartridge having a projection whose position on said supply cartridge corresponds to the speed of film in said cartridge, and said projection acting on said feeler lever which cooperates with said supply cartridge to maintain said latter feeler lever between said extreme positions thereof except when said projection of said cartridge is at a location indicative of a film speed beyond the range of film speeds which can be handled by the camera, whereby even if both cartridges are in said camera housing, if said projection of said supply cartridge indicates a film speed beyond the range of film speed which can be handled by the camera said film transporting means will still be blocked by said blocking means.

35. In a camera, in combination, a camera housing formed with a chamber for receiving a supply cartridge which carries coding means which is indicative of the speed of the film which is in the supply cartridge; film transporting means carried by said housing; and blocking means cooperating with said film transporting means for blocking the operation thereof when there is no cartridge in said chamber, said coding means of said cartridge cooperating with said blocking means for displacing the latter to a release position releasing said film transporting means for operation when a cartridge is in said chamber.

36. In a camera as recited in claim 35, said blocking means including a feeler extending into said chamber to be engaged and moved by a coding means of a supply cartridge which is introduced into said chamber, and said coding means of said supply cartridge when said coding means is indicative of a film speed beyond the range of film speeds which can be handled by said camera leaving said feeler and said blocking means in a blocking position even if a supply cartridge is in said chamber, so that said blocking means will be displaced to said release position thereof only when a cartridge having film suitable for exposure in said camera is placed in said chamber thereof.

37. In a camera, in combination, a camera housing formed with a cartridge chamber for receiving a supply cartridge which carries a projection which is indicative of the speed of film in the supply cartridge; a rotary gear carried by said camera housing and forming part of a film transporting means; a pair of blocking levers carried by said camera housing for turning movement about a common axis and respectively having teeth which are adapted to engage said gear to prevent rotation thereof and thus prevent operation of said film transporting means when said blocking levers are in blocking positions; first spring means situated between and pressing against said levers for urging them apart from each other to unblocking positions spaced from said gear to release said film transporting means for operation; a feeler extending into said chamber to be engaged by a projection of a cartridge introduced into said chamber to be displaced by said projection; transmission lever means operatively connected to said feeler and engaging said blocking levers for controlling the position thereof; and second spring means stronger than said first spring means acting on said feeler for urging the latter to one end position, said second spring means being stronger than said first spring means and maintaining one of said blocking levers in its blocking position when said feeler is in said one end position thereof, said feeler remaining in said one end position thereof either when there is no cartridge in said chamber or when the projection of said cartridge is situated beyond one end of a range of film speeds which can be handled by the camera, said projection when situated beyond the opposite end of said range of film speeds displacing said feeler to an opposite end position where said transmission lever means acts on the other of said blocking levers to displace the latter in opposition to said first spring means to its blocking position, so that said gear is blocked either where there is no cartridge in said chamber or when the cartridge which is in said chamber has in its interior a film whose speed is beyond the range of film speeds which can be handled by the camera.

38. In a camera, in combination, a camera housing formed with a cartridge chamber for receiving a supply cartridge; light measuring means carried by said camera housing and including a moving coil instrument; and means extending into said chamber and operatively connected with said instrument for rendering the latter inoperative when there is no cartridge in said chamber and for rendering said moving coil instrument operative when there is a cartridge in said chamber.

39. In a camera as recited in claim 38, said means for rendering said moving coil instrument operative or inoperative including a feeler extending into said chamber and a spring acting on said feeler to displace the latter to an end position where said moving coil instrument is rendered inoperative when there is no cartridge in said chamber, a cartridge when introduced into said chamber displacing said feeler in opposition to said spring means to a position which renders said moving coil instrument operative.

40. In a camera as recited in claim 39, said cartridge carrying a projection which is indicative of the film speed of the film in the cartridge, and said projection engaging said feeler to displace the latter when a cartridge is introduced into said chamber.

41. In a camera as recited in claim 40, said feeler remaining in said end position where said moving coil instrument is inoperative when said projection of said cartridge is in a position indicating a film speed beyond the range of film speeds which can be handled by the camera.

42. In a camera, in combination, a camera housing formed with a cartridge chamber for receiving a supply cartridge; light measuring means including a moving coil instrument having a pointer portion which indicates the light intensity; viewfinder means in which said pointer portion is visible for indicating the light intensity; and means extending into said chamber and cooperating with said pointer portion for rendering the latter invisible in said viewfinder means when there is no cartridge in said chamber, said means for rendering said pointer portion invisible in said viewfinder means being displaced by a cartridge introduced into said chamber to a position rendering said pointer portion visible in said viewfinder means, so that the lack of visibility of said pointer portion in said viewfinder means is an indication that a cartridge is lacking from said chamber.

43. In a camera as recited in claim 42, said means for rendering said pointer portion invisible including a lever carrying a light-blocking element which is in a position blocking light from moving along a path which will render said pointer visible, and transmission means extending between said feeler and lever for turning the latter from a position where the light is blocked for movement along said path to a position releasing light for movement along said path when a cartridge is introduced into said chamber.

44. In a camera, in combination, a camera housing formed with a chamber for receiving a supply cartridge which carries a projection whose position on said cartridge is indicative of the speed of film in said cartridge, said camera being adapted to handle film whose film speeds are within a predetermined range of film speeds; viewfinder means; a moving coil instrument having a pointer portion situated along a light path extending to said viewfinder means for rendering said pointer portion visible when looking into said viewfinder means; a lever turnably carried by said camera housing and having a pair of light-blocking portions one of which is situated in said light path to block the latter and render said pointer portion invisible when said lever is in one extreme position and the other of which is in said light path to render said pointer portion invisible when said lever is in another extreme position, said pointer portion being visible when said lever is between said extreme positions thereof so that said light-blocking portions are displaced from said path; a feeler extending into said chamber to be engaged by a projection of a cartridge introduced into said chamber and displaced by said projection, and transmission means extending between said feeler and lever for transmitting movement of said feeler to said lever, said feeler, when there is no cartridge in said chamber, being in one end position where said lever is in said one extreme position blocking light which moves along said path so as to render said pointer invisible, and said feeler remaining in said one end position when the projection of a cartridge is situated beyond one end of said range of film speeds, while when a cartridge having a projection indicating a film speed beyond the other end of said range is introduced into said chamber said latter projection will displace said feeler to an opposite end position which will displace said lever to a position placing the other light-blocking portion thereof in a blocking position preventing said pointer portion from being visible, so that said pointer portion is visible only when a cartridge is in said chamber and when the speed of the film in said cartridge is within the range of film speeds which can be handled by the camera.

45. In a camera, in combination, a camera housing formed with a chamber for receiving a supply cartridge; a moving coil instrument carried by said camera housing and having a movable pointer; scanning means having a rest position and moving from said rest position to a scanning position for scanning the position of said pointer, said scanning means when moving from said rest to said scanning position thereof automatically adjusting at least part of a camera structure which determines the extent to which film in the camera is exposed; and means extending into said chamber and blocking displacement of said scanning means from said rest to said scanning position thereof when there is no cartridge in said chamber.

46. In a camera as recited in claim 45, said means for preventing displacement of said scanning means from said rest to said scanning position thereof including a blocking lever extending into said chamber to be displaced by a cartridge introduced into the same and having a blocking portion situated, when there is no cartridge in said chamber, in the path of movement of a portion of said scanning means to prevent the latter from being displaced from said rest to said scanning position thereof.

47. In a camera as recited in claim 46, said blocking lever having a pair of blocking arms one of which is situated in the path of movement of said portion of said said scanning means when said blocking lever is in one end position and the other of which is situated in the path of movement of said portion of said scanning means when said blocking lever is in an opposite end position, said scanning means being movable from said rest to said scanning position thereof when said blocking level is between said end positions thereof, and a supply cartridge which is introduced into said chamber carrying a projection which is indicative of the speed of film in said cartridge and which engages said blocking level to displace the latter from said one toward said opposite end position thereof, said blocking lever remaining in said one end position thereof when there is no cartridge in said chamber or when the projection carried by a cartridge is situated beyond one end of the range of film speeds which can be handled by the camera, while when a cartridge carrying a projection situated beyond the opposite end of said range is introduced into said chamber said latter projection will displace said blocking lever to said operative end position thereof, so that said scanning means is blocked against movement from said rest toward said scanning position thereof not only when there is no cartridge in said chamber but also when a cartridge in said chamber contains film whose speed is beyond the range which can be handled by the camera.

48. In a camera, in combination, a camera housing formed with a chamber for receiving a supply cartridge; light-measuring means carried by said camera housing and including a photosensitive element; cover means located in front of said photosensitive element and displaceable between positions respectively covering and uncovering said element; and means extending into said chamber and operatively connected to said cover means for displacing the latter from said covering to said, uncovering position thereof only when a cartridge is introduced into said chamber.

49. In a camera as recited in claim 48, said cover means being in the form of an opaque plate formed with elongated parallel slots which are spaced from each other by elongated opaque portions situated between said slots and said camera housing carrying a honeycomb lens through which light passes to reach said photosensitive element, said opaque plate being situated between said lens and said photosensitive element and said honeycomb lens having elongated parallel opaque portions which are aligned with said elongated parallel opaque portions of said plate when said cover means is in said uncovering position thereof and which are aligned with said slots of said plate to cover said slots, respectively, when said cover means is in said covering position thereof.

50. In a camera, in combination, a camera housing formed with a chamber for receiving a supply cartridge; a moving coil instrument carried by said camera housing; and electrical means responding to the presence or absence of a cartridge in said chamber and electrically connected to said moving coil instrument for rendering the latter inoperative when there is no cartridge in said chamber.

51. In a camera as rectied in claim 50, said electrical means opening the circuit of said moving coil instrument when there is no cartridge in said chamber.

52. In a camera as recited in claim 50, said electrical means short-circuiting said moving coil instrument when there is no cartridge in said chamber.

53. In a camera as recited in claim 50, said electrical means including an elongated switch arm extending into said chamber and acting as a feeler to be displaced by a cartridge introduced into said chamber, said switch arm carrying a contact which moves with said switch arm, and at least one stationary contact engaged by said movable contact carried by said switch arm when there is no cartridge in said chamber, said contacts forming a switch of a closed circuit loop in which said moving coil instrument is located so that when said switch is closed said moving coil instrument is short-circuited.

54. In a camera as recited in claim 53, a second stationary contact located in the path of movement of said contact carried by said switch arm and defining a limit of movement thereof opposite from the limit of movement defined by said first stationary contact, said loop of said circuit also being closed when said movable contact engages said second stationary contact, and a cartridge which is introduced into said chamber carrying a projection whose position on said cartridge is indicative of the speed of the film in said cartridge, said camera being capable of handling film speeds within a predetermined range and when the film in the cartridge is of a speed beyond said range said projection of said cartridge either releasing said arm for engagement between said movable contact and said first stationary contact or displacing said arm to a position where said movable contact engages said second stationary contact, whereby said moving coil instrument is short-circuited either when there is no cartridge in said chamber or when the cartridge placed in said chamber contains film whose film speed is beyond the range of film speeds which can be handled by the camera.

55. In a camera as recited in claim 50, said moving coil instrument being located in a given electrical circuit and said electrical means including an elongated feeler arm extending into said chamber to be displaced by a cartridge intorduced into the latter, said arm having one end position when there is no cartridge in said chamber and being displaceable from said one end position to an opposite end position, said arm carrying a springy electrical contact and said circuit including a stationary electrical contact engaged by said springy contact during movement of said arm through a predetermined range between said end positions thereof, said springy contact when said arm is at either of said end positions thereof being spaced from said stationary contact so as to open said circuit and thus prevent operation of said moving coil instrument.

56. In a camera, in combination, a housing having a cartridge chamber for receiving a supply cartridge of the type having coding means indicative of the speed of film therein; light measuring means carried by said housing; and feeler means extending into said chamber and operatively connected to said light measuring means for rendering the latter inoperative when there is no cartridge in said chamber and for rendering said light measuring means operative when there is a cartridge in said chamber and when the coding means of such cartridge is indicative of a film speed within a predetermined range of film speeds, said feeler means being engaged by the coding means of a cartridge containing film having a speed within said range.

57. In a camera, in combination, a housing having a cartridge chamber for receiving a supply cartridge of the type having coding means indicative of the speed of film therein; light actuated means comprising photoelectric means and at least one movable member connected to said photoelectric means and adapted to be moved thereby in dependency upon variations in the intensity of light impinging upon said photoelectric means; and feeler means extending into said chamber and operatively connected with said light actuated means for rendering the latter inoperative when there is no cartridge in said chamber and for rendering said light actuated means operative when there is a cartridge in said chamber and when the coding means of such cartridge is indicative of a film speed within a predetermined range of film speeds, said feeler means being engaged by the coding means of a cartridge containing film having a speed within said range.

References Cited

UNITED STATES PATENTS

| | | | |
|---|---|---|---|
| 2,674,930 | 4/1954 | Goldhammer | 95—31 |
| 2,766,669 | 10/1956 | Weisse et al. | 95—31 |
| 3,025,777 | 3/1962 | Wilkenson | 95—10 |
| 3,260,183 | 7/1966 | Winkler et al. | 95—31 |
| 3,266,397 | 8/1966 | Kremp et al. | 95—10 |

FOREIGN PATENTS

| | | |
|---|---|---|
| 1,342,730 | 9/1963 | France. |
| 864,803 | 1/1953 | Germany. |

NORTON ANSHER, Primary Examiner

J. F. PETERS, Jr., Assistant Examiner

U.S. Cl. X.R.

95—31; 352—72